(12) United States Patent
Hardy

(10) Patent No.: US 9,756,378 B2
(45) Date of Patent: Sep. 5, 2017

(54) SINGLE FILE PVR PER SERVICE ID

(71) Applicant: EchoStar Technologies LLC, Englewood, CO (US)

(72) Inventor: Rocky Hardy, Aurora, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 14/591,549

(22) Filed: Jan. 7, 2015

(65) Prior Publication Data

US 2016/0198215 A1    Jul. 7, 2016

(51) Int. Cl.
*H04N 21/433* (2011.01)
*H04N 5/781* (2006.01)
*H04N 21/472* (2011.01)
*H04N 21/4147* (2011.01)
*H04N 21/426* (2011.01)
(Continued)

(52) U.S. Cl.
CPC ......... *H04N 21/4334* (2013.01); *H04N 5/775* (2013.01); *H04N 5/781* (2013.01); *H04N 9/8205* (2013.01); *H04N 21/4147* (2013.01); *H04N 21/4263* (2013.01); *H04N 21/42204* (2013.01); *H04N 21/4331* (2013.01); *H04N 21/4332* (2013.01); *H04N 21/4335* (2013.01); *H04N 21/4383* (2013.01); *H04N 21/44004* (2013.01); *H04N 21/44008* (2013.01); *H04N 21/4583* (2013.01); *H04N 21/47214* (2013.01); *H04N 21/8456* (2013.01)

(58) Field of Classification Search
CPC .......... H04N 21/432; H04N 21/23106; H04N 21/47214; H04N 21/47217
See application file for complete search history.

(56) References Cited

U.S. PATENT DOCUMENTS 4,706,121 A    11/1987  Young
4,723,246 A     2/1988  Weldon, Jr.
(Continued)

FOREIGN PATENT DOCUMENTS

CN    1595975 A    3/2005
CN    1615017 A    5/2005
(Continued)

OTHER PUBLICATIONS

Office Action for EP 13 192 169.4 dated Mar. 29, 2016, all pages.
(Continued)

*Primary Examiner* — Olugbenga Idowu
(74) *Attorney, Agent, or Firm* — Kilpatrick Townsend & Stockton LLP

(57) ABSTRACT

Systems and methods for recording multiple broadcast television programs to a single file may include receiving user selection for recording a first media content and a second media content, determining the first media content and the second media content are provided on a single television service, and tuning to the television service to receive the first media content via a tuner of the television receiver. The systems and methods may include recording the first media content as a first permanent recording to a master file, receiving the second media content via the tuner of the television receiver, and recording the second media content as a second permanent recording to the master file.

20 Claims, 6 Drawing Sheets

(51) Int. Cl.
*H04N 21/438* (2011.01)
*H04N 21/422* (2011.01)
*H04N 21/4335* (2011.01)
*H04N 21/44* (2011.01)
*H04N 21/845* (2011.01)
*H04N 5/775* (2006.01)
*H04N 9/82* (2006.01)
*H04N 21/458* (2011.01)

(56) References Cited

U.S. PATENT DOCUMENTS

| | | |
|---|---|---|
| 4,802,215 A | 1/1989 | Mason |
| 5,187,589 A | 2/1993 | Kono et al. |
| 5,335,277 A | 8/1994 | Harvey et al. |
| 5,483,277 A | 1/1996 | Granger |
| 5,488,658 A | 1/1996 | Hirashima |
| 5,541,738 A | 7/1996 | Mankovitz |
| 5,608,652 A | 3/1997 | Astle |
| 5,642,153 A | 6/1997 | Chaney et al. |
| 5,682,597 A | 10/1997 | Ganek et al. |
| 5,684,969 A | 11/1997 | Ishida |
| 5,724,646 A | 3/1998 | Ganek et al. |
| 5,805,763 A | 9/1998 | Lawler et al. |
| 5,974,218 A | 10/1999 | Nagasaka et al. |
| 6,049,333 A | 4/2000 | LaJoie et al. |
| 6,263,504 B1 | 7/2001 | Ebisawa |
| 6,351,474 B1 | 2/2002 | Robinett et al. |
| 6,373,904 B1 | 4/2002 | Sakamoto et al. |
| 6,453,115 B1 | 9/2002 | Boyle |
| 6,628,891 B1 | 9/2003 | Vantalon et al. |
| 6,687,296 B1 | 2/2004 | Sato et al. |
| 6,701,528 B1 | 3/2004 | Arsenault et al. |
| 6,728,883 B1 | 4/2004 | Kohashi et al. |
| 6,766,523 B2 | 7/2004 | Herley |
| 6,771,703 B1 | 8/2004 | Oguz et al. |
| 6,798,971 B2 | 9/2004 | Potrebic |
| 6,938,208 B2 | 8/2005 | Reichardt |
| 7,024,676 B1 | 4/2006 | Klopfenstein |
| 7,062,048 B2 | 6/2006 | Livaditis et al. |
| 7,409,140 B2 | 8/2008 | Rodriguez et al. |
| 7,487,529 B1 | 2/2009 | Orlick |
| 7,490,169 B1 | 2/2009 | Ogdon et al. |
| 7,493,312 B2 | 2/2009 | Liu et al. |
| 7,505,081 B2 | 3/2009 | Eshleman |
| 7,533,402 B2 | 5/2009 | Demas et al. |
| 7,542,656 B2 | 6/2009 | Cho et al. |
| 7,546,618 B2 | 6/2009 | Bacon |
| 7,577,751 B2 | 8/2009 | Vinson et al. |
| 7,590,993 B1 | 9/2009 | Hendricks et al. |
| 7,684,672 B2 | 3/2010 | Matoba |
| 7,715,552 B2 | 5/2010 | Pinder et al. |
| 7,730,517 B1 | 6/2010 | Rey et al. |
| 7,739,711 B2 | 6/2010 | Finseth et al. |
| 7,760,986 B2 | 7/2010 | Beuque |
| 7,804,861 B2 | 9/2010 | Kim |
| 7,848,618 B2 | 12/2010 | Potrebic et al. |
| 7,856,557 B2 | 12/2010 | Beuque |
| 7,926,078 B2 | 4/2011 | Arsenault et al. |
| 7,929,697 B2 | 4/2011 | McNeely et al. |
| 7,962,937 B2 | 6/2011 | Cho et al. |
| 8,006,268 B2 | 8/2011 | Sloo |
| 8,201,194 B2 | 6/2012 | Wijnands et al. |
| 8,321,466 B2 | 11/2012 | Black et al. |
| 8,364,671 B1 | 1/2013 | Sinton et al. |
| 8,437,622 B2 | 5/2013 | Casagrande |
| 8,447,170 B2 | 5/2013 | Casagrande |
| 8,566,873 B2 | 10/2013 | Sie et al. |
| 8,584,167 B2 | 11/2013 | Vanduyn |
| 8,606,088 B2 | 12/2013 | Kummer et al. |
| 8,627,349 B2 | 1/2014 | Kirby et al. |
| 8,660,412 B2 | 2/2014 | Kummer et al. |
| 8,763,027 B2 | 6/2014 | Martch |
| 8,774,608 B2 | 7/2014 | Kummer et al. |
| 8,819,722 B2 | 8/2014 | Kummer et al. |
| 8,819,761 B2 | 8/2014 | Minnick |
| 8,850,476 B2 | 9/2014 | VanDuyn et al. |
| 8,867,893 B2 | 10/2014 | Kirby |
| 8,959,544 B2 | 2/2015 | Kummer et al. |
| 8,959,566 B2 | 2/2015 | Kummer |
| 8,989,562 B2 | 3/2015 | Kummer et al. |
| 8,997,153 B2 | 3/2015 | Templeman |
| 9,031,385 B2 | 5/2015 | Casagrande et al. |
| 9,043,843 B2 | 5/2015 | Templeman et al. |
| 9,055,274 B2 | 6/2015 | Casagrande |
| 9,088,763 B2 | 7/2015 | Martch et al. |
| 9,106,965 B2 | 8/2015 | Kummer et al. |
| 9,113,222 B2 | 8/2015 | VanDuyn |
| 9,161,090 B2 | 10/2015 | Kummer et al. |
| 9,177,605 B2 | 11/2015 | Minnick et al. |
| 9,177,606 B2 | 11/2015 | Kirby |
| 9,185,331 B2 | 11/2015 | Martch et al. |
| 9,191,694 B2 | 11/2015 | Casagrande |
| 9,202,524 B2 | 12/2015 | Martch et al. |
| 9,264,779 B2 | 2/2016 | Kirby et al. |
| 9,269,397 B2 | 2/2016 | Casagrande et al. |
| 9,349,412 B2 | 5/2016 | Templeman |
| 9,350,937 B2 | 5/2016 | Kummer et al. |
| 9,357,159 B2 | 5/2016 | Martch et al. |
| 9,361,940 B2 | 6/2016 | Minnick |
| 9,412,413 B2 | 8/2016 | Martch |
| 9,489,981 B2 | 11/2016 | Templeman et al. |
| 9,489,982 B2 | 11/2016 | Casagrande et al. |
| 9,521,440 B2 | 12/2016 | Kummer et al. |
| 9,549,213 B2 | 1/2017 | Templeman et al. |
| 2001/0028782 A1 | 10/2001 | Ohno et al. |
| 2001/0033736 A1 | 10/2001 | Yap et al. |
| 2001/0034787 A1 | 10/2001 | Takao et al. |
| 2002/0042914 A1 | 4/2002 | Walker et al. |
| 2002/0044658 A1 | 4/2002 | Wasilewski et al. |
| 2002/0054752 A1 | 5/2002 | Wood et al. |
| 2002/0055343 A1 | 5/2002 | Stetzler et al. |
| 2002/0087973 A1 | 7/2002 | Hamilton et al. |
| 2002/0087979 A1 | 7/2002 | Dudkiewicz et al. |
| 2002/0087983 A1 | 7/2002 | Son et al. |
| 2002/0092017 A1 | 7/2002 | Klosterman et al. |
| 2002/0092021 A1 | 7/2002 | Yap et al. |
| 2002/0095510 A1 | 7/2002 | Sie et al. |
| 2002/0097340 A1 | 7/2002 | Takagi et al. |
| 2002/0116705 A1 | 8/2002 | Perlman |
| 2002/0120925 A1 | 8/2002 | Logan |
| 2002/0126221 A1 | 9/2002 | Link |
| 2002/0141431 A1 | 10/2002 | Tripathy |
| 2002/0144259 A1 | 10/2002 | Gutta et al. |
| 2002/0144266 A1 | 10/2002 | Goldman et al. |
| 2002/0152299 A1 | 10/2002 | Traversat et al. |
| 2002/0164147 A1 | 11/2002 | Suda |
| 2002/0168178 A1 | 11/2002 | Rodriguez et al. |
| 2002/0174430 A1 | 11/2002 | Ellis et al. |
| 2002/0184638 A1 | 12/2002 | Agnihortri et al. |
| 2002/0188943 A1 | 12/2002 | Freeman et al. |
| 2003/0002577 A1 | 1/2003 | Pinder |
| 2003/0005454 A1 | 1/2003 | Rodriguez et al. |
| 2003/0026423 A1 | 2/2003 | Unger et al. |
| 2003/0078930 A1 | 4/2003 | Surcouf et al. |
| 2003/0097659 A1 | 5/2003 | Goldman |
| 2003/0110514 A1 | 6/2003 | West et al. |
| 2003/0115589 A1 | 6/2003 | D'Souza et al. |
| 2003/0123657 A1 | 7/2003 | Bjordammen et al. |
| 2003/0149988 A1 | 8/2003 | Ellis et al. |
| 2003/0152360 A1 | 8/2003 | Mukai et al. |
| 2003/0156826 A1 | 8/2003 | Sonoda et al. |
| 2003/0159157 A1 | 8/2003 | Chan |
| 2003/0177492 A1 | 9/2003 | Kanou |
| 2003/0177495 A1 | 9/2003 | Needham et al. |
| 2003/0196211 A1 | 10/2003 | Chan |
| 2003/0200548 A1 | 10/2003 | Baran et al. |
| 2003/0208756 A1 | 11/2003 | Macrae et al. |
| 2003/0208763 A1 | 11/2003 | McElhatten et al. |
| 2003/0208767 A1 | 11/2003 | Williamson et al. |
| 2003/0226150 A1 | 12/2003 | Berberet et al. |
| 2004/0001087 A1 | 1/2004 | Warmus et al. |
| 2004/0003118 A1 | 1/2004 | Brown et al. |
| 2004/0003399 A1 | 1/2004 | Cooper |

(56) References Cited

U.S. PATENT DOCUMENTS

| | | |
|---|---|---|
| 2004/0015992 A1 | 1/2004 | Hasegawa et al. |
| 2004/0015999 A1 | 1/2004 | Carlucci et al. |
| 2004/0078829 A1 | 4/2004 | Patel et al. |
| 2004/0080672 A1 | 4/2004 | Kessler et al. |
| 2004/0102154 A1 | 5/2004 | Klauss et al. |
| 2004/0103428 A1 | 5/2004 | Seok et al. |
| 2004/0117827 A1 | 6/2004 | Karaoguz et al. |
| 2004/0128682 A1 | 7/2004 | Liga et al. |
| 2004/0133923 A1 | 7/2004 | Watson et al. |
| 2004/0148501 A1 | 7/2004 | Livaditis et al. |
| 2004/0148628 A1 | 7/2004 | Mears |
| 2004/0162871 A1 | 8/2004 | Pabla et al. |
| 2004/0181800 A1 | 9/2004 | Rakib et al. |
| 2004/0181813 A1 | 9/2004 | Ota et al. |
| 2004/0189873 A1 | 9/2004 | Konig et al. |
| 2004/0218905 A1 | 11/2004 | Green et al. |
| 2004/0242150 A1 | 12/2004 | Wright et al. |
| 2004/0255336 A1 | 12/2004 | Logan et al. |
| 2004/0268387 A1 | 12/2004 | Wendling |
| 2005/0002640 A1 | 1/2005 | Putterman |
| 2005/0034171 A1 | 2/2005 | Benya |
| 2005/0071877 A1 | 3/2005 | Navarro |
| 2005/0083865 A1 | 4/2005 | Ashley et al. |
| 2005/0120049 A1 | 6/2005 | Kanegae et al. |
| 2005/0125683 A1 | 6/2005 | Matsuyama et al. |
| 2005/0144646 A1 | 6/2005 | Lecrom et al. |
| 2005/0147383 A1 | 7/2005 | Ihara |
| 2005/0175178 A1 | 8/2005 | Candelore et al. |
| 2005/0180568 A1 | 8/2005 | Krause |
| 2005/0229213 A1 | 10/2005 | Ellis et al. |
| 2005/0237435 A1 | 10/2005 | Potrebic et al. |
| 2005/0271365 A1 | 12/2005 | Hisatomi |
| 2005/0273819 A1 | 12/2005 | Knudson et al. |
| 2005/0281531 A1 | 12/2005 | Unmehopa |
| 2005/0283797 A1 | 12/2005 | Eldering et al. |
| 2006/0010464 A1 | 1/2006 | Azami |
| 2006/0020962 A1 | 1/2006 | Stark et al. |
| 2006/0053077 A1 | 3/2006 | Mourad et al. |
| 2006/0056800 A1 | 3/2006 | Shimagami et al. |
| 2006/0064383 A1 | 3/2006 | Marking |
| 2006/0075434 A1 | 4/2006 | Chaney et al. |
| 2006/0078055 A1 | 4/2006 | Kanazawa |
| 2006/0080716 A1 | 4/2006 | Nishikawa et al. |
| 2006/0085828 A1 | 4/2006 | Dureau et al. |
| 2006/0120523 A1 | 6/2006 | Kurotaki |
| 2006/0206819 A1 | 9/2006 | Tsuji et al. |
| 2006/0206912 A1 | 9/2006 | Klarfeld et al. |
| 2006/0212900 A1 | 9/2006 | Ismail et al. |
| 2006/0215993 A1 | 9/2006 | Yamada |
| 2006/0257099 A1 | 11/2006 | Potrebic et al. |
| 2006/0274208 A1 | 12/2006 | Pedlow, Jr. |
| 2007/0016546 A1 | 1/2007 | De Vorchik et al. |
| 2007/0019930 A1* | 1/2007 | Kim ............ H04N 5/76 386/249 |
| 2007/0039032 A1 | 2/2007 | Goldey et al. |
| 2007/0040947 A1 | 2/2007 | Koga |
| 2007/0061378 A1 | 3/2007 | Lee et al. |
| 2007/0107010 A1 | 5/2007 | Jolna et al. |
| 2007/0109445 A1 | 5/2007 | Lee |
| 2007/0136753 A1 | 6/2007 | Bovenschulte et al. |
| 2007/0154163 A1 | 7/2007 | Cordray |
| 2007/0157248 A1 | 7/2007 | Ellis |
| 2007/0157253 A1 | 7/2007 | Ellis et al. |
| 2007/0165855 A1 | 7/2007 | Inui |
| 2007/0183745 A1 | 8/2007 | White |
| 2007/0188665 A1 | 8/2007 | Watson et al. |
| 2007/0192586 A1 | 8/2007 | McNeely |
| 2007/0204288 A1 | 8/2007 | Candelore |
| 2007/0234395 A1 | 10/2007 | Dureau et al. |
| 2007/0250856 A1 | 10/2007 | Leavens et al. |
| 2007/0258596 A1 | 11/2007 | Kahn et al. |
| 2008/0022299 A1 | 1/2008 | Le Buhan |
| 2008/0022347 A1 | 1/2008 | Cohen |
| 2008/0044158 A1* | 2/2008 | Kido ............ H04N 5/76 386/291 |
| 2008/0046929 A1 | 2/2008 | Cho et al. |
| 2008/0052743 A1 | 2/2008 | Moore |
| 2008/0066111 A1 | 3/2008 | Ellis et al. |
| 2008/0074547 A1 | 3/2008 | Ida |
| 2008/0086745 A1 | 4/2008 | Knudson et al. |
| 2008/0092164 A1 | 4/2008 | Agarwal et al. |
| 2008/0092181 A1 | 4/2008 | Britt |
| 2008/0101760 A1 | 5/2008 | Waller |
| 2008/0104534 A1 | 5/2008 | Park et al. |
| 2008/0127253 A1 | 5/2008 | Zhang et al. |
| 2008/0137850 A1 | 6/2008 | Mamidwar |
| 2008/0141322 A1 | 6/2008 | Jang et al. |
| 2008/0144747 A1 | 6/2008 | Tomizawa |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1 | 9/2008 | Pfeffer et al. |
| 2008/0222678 A1 | 9/2008 | Burke et al. |
| 2008/0222681 A1 | 9/2008 | Kwon |
| 2008/0271076 A1 | 10/2008 | Schlack |
| 2008/0271077 A1 | 10/2008 | Kim et al. |
| 2008/0273698 A1 | 11/2008 | Manders et al. |
| 2008/0273856 A1* | 11/2008 | Bumgardner ......... H04N 5/782 386/292 |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0301740 A1 | 12/2008 | Tsutsui |
| 2008/0307217 A1 | 12/2008 | Yukimatsu et al. |
| 2009/0025027 A1 | 1/2009 | Craner |
| 2009/0051579 A1 | 2/2009 | Inaba et al. |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0110367 A1 | 4/2009 | Fukui |
| 2009/0129741 A1 | 5/2009 | Kim |
| 2009/0129749 A1 | 5/2009 | Oyamatsu et al. |
| 2009/0136206 A1 | 5/2009 | Aisu |
| 2009/0150941 A1 | 6/2009 | Riedl et al. |
| 2009/0153747 A1 | 6/2009 | Grimes |
| 2009/0158370 A1 | 6/2009 | Li et al. |
| 2009/0165057 A1 | 6/2009 | Miller et al. |
| 2009/0172722 A1 | 7/2009 | Kahn et al. |
| 2009/0178079 A1 | 7/2009 | Derrenberger et al. |
| 2009/0178098 A1 | 7/2009 | Westbrook et al. |
| 2009/0183196 A1 | 7/2009 | Chen et al. |
| 2009/0210912 A1 | 8/2009 | Cholas et al. |
| 2009/0235298 A1 | 9/2009 | Carlberg et al. |
| 2009/0254962 A1 | 10/2009 | Hendricks et al. |
| 2009/0260038 A1 | 10/2009 | Acton et al. |
| 2009/0313674 A1 | 12/2009 | Ludvig et al. |
| 2009/0320073 A1 | 12/2009 | Reisman |
| 2009/0320084 A1 | 12/2009 | Azam et al. |
| 2009/0322962 A1 | 12/2009 | Weeks |
| 2009/0324203 A1 | 12/2009 | Wiklof |
| 2010/0020794 A1 | 1/2010 | Cholas et al. |
| 2010/0037282 A1 | 2/2010 | Iwata et al. |
| 2010/0043022 A1 | 2/2010 | Kaftan |
| 2010/0050225 A1 | 2/2010 | Bennett |
| 2010/0086277 A1 | 4/2010 | Craner |
| 2010/0095323 A1 | 4/2010 | Williamson et al. |
| 2010/0100899 A1 | 4/2010 | Bradbury et al. |
| 2010/0115121 A1 | 5/2010 | Roos et al. |
| 2010/0131983 A1 | 5/2010 | Shannon et al. |
| 2010/0135639 A1 | 6/2010 | Ellis et al. |
| 2010/0146581 A1 | 6/2010 | Erk |
| 2010/0158479 A1 | 6/2010 | Craner |
| 2010/0158480 A1 | 6/2010 | Jung et al. |
| 2010/0162285 A1 | 6/2010 | Cohen et al. |
| 2010/0169926 A1 | 7/2010 | Westberg et al. |
| 2010/0195827 A1 | 8/2010 | Lee et al. |
| 2010/0199299 A1 | 8/2010 | Chang et al. |
| 2010/0217613 A1 | 8/2010 | Kelly |
| 2010/0232604 A1 | 9/2010 | Eklund, II |
| 2010/0235862 A1 | 9/2010 | Adachi |
| 2010/0239228 A1 | 9/2010 | Sano |
| 2010/0242079 A1 | 9/2010 | Riedl et al. |
| 2010/0246582 A1 | 9/2010 | Salinger et al. |

(56) References Cited

U.S. PATENT DOCUMENTS

| | | |
|---|---|---|
| 2010/0247067 A1 | 9/2010 | Gratton |
| 2010/0251304 A1 | 9/2010 | Donoghue et al. |
| 2010/0251305 A1 | 9/2010 | Kimble et al. |
| 2010/0254386 A1 | 10/2010 | Salinger et al. |
| 2010/0265391 A1 | 10/2010 | Muramatsu et al. |
| 2010/0284537 A1 | 11/2010 | Inbar |
| 2010/0293583 A1 | 11/2010 | Loebig et al. |
| 2010/0299528 A1 | 11/2010 | Le Floch |
| 2010/0306401 A1 | 12/2010 | Gilson |
| 2010/0313222 A1 | 12/2010 | Lee et al. |
| 2010/0319037 A1 | 12/2010 | Kim |
| 2010/0329645 A1 | 12/2010 | Sakamoto |
| 2011/0001879 A1 | 1/2011 | Goldey et al. |
| 2011/0007218 A1 | 1/2011 | Moran et al. |
| 2011/0008024 A1 | 1/2011 | Sasaki et al. |
| 2011/0043652 A1 | 2/2011 | King et al. |
| 2011/0055866 A1 | 3/2011 | Piepenbrink et al. |
| 2011/0078750 A1 | 3/2011 | Tam et al. |
| 2011/0080529 A1 | 4/2011 | Wong |
| 2011/0093897 A1 | 4/2011 | Gerba et al. |
| 2011/0099364 A1 | 4/2011 | Robyr et al. |
| 2011/0106744 A1 | 5/2011 | Becker et al. |
| 2011/0131413 A1 | 6/2011 | Moon et al. |
| 2011/0131622 A1 | 6/2011 | Wu et al. |
| 2011/0138169 A1 | 6/2011 | Michel |
| 2011/0138424 A1 | 6/2011 | Vlot |
| 2011/0145854 A1 | 6/2011 | Bacon et al. |
| 2011/0150429 A1 | 6/2011 | Kaneko |
| 2011/0162011 A1 | 6/2011 | Hassell et al. |
| 2011/0179453 A1 | 7/2011 | Poniatowski |
| 2011/0219396 A1 | 9/2011 | Kudelski |
| 2011/0225616 A1 | 9/2011 | Ellis |
| 2011/0235701 A1 | 9/2011 | Kim |
| 2011/0239249 A1 | 9/2011 | Murison et al. |
| 2011/0247037 A1 | 10/2011 | Pandey et al. |
| 2011/0255002 A1 | 10/2011 | Witheiler |
| 2011/0286719 A1* | 11/2011 | Woods .................. H04N 5/76 386/293 |
| 2011/0310305 A1 | 12/2011 | Alexander |
| 2011/0311045 A1 | 12/2011 | Candelore et al. |
| 2012/0131627 A1 | 5/2012 | Chittella |
| 2012/0183276 A1 | 7/2012 | Quan et al. |
| 2012/0195433 A1 | 8/2012 | Eppolito et al. |
| 2012/0198501 A1 | 8/2012 | Ruan et al. |
| 2012/0222066 A1 | 8/2012 | Charania et al. |
| 2012/0236933 A1 | 9/2012 | Saitoh et al. |
| 2012/0278837 A1 | 11/2012 | Curtis et al. |
| 2012/0296745 A1 | 11/2012 | Harper et al. |
| 2012/0301104 A1 | 11/2012 | Dove |
| 2012/0311534 A1 | 12/2012 | Fox et al. |
| 2012/0311634 A1 | 12/2012 | Van Duyn |
| 2012/0311649 A1 | 12/2012 | Patten et al. |
| 2012/0331505 A1 | 12/2012 | Chun et al. |
| 2013/0014146 A1 | 1/2013 | Bhatia et al. |
| 2013/0014159 A1 | 1/2013 | Wiser et al. |
| 2013/0014162 A1 | 1/2013 | Chen et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0081098 A1* | 3/2013 | Klughart ................ H04N 5/76 725/153 |
| 2013/0135535 A1 | 5/2013 | Ling |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0339997 A1 | 12/2013 | Farkash et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0086407 A1 | 3/2014 | Gustafsson et al. |
| 2014/0115636 A1 | 4/2014 | Stuckman |
| 2014/0126889 A1 | 5/2014 | Kummer et al. |
| 2014/0130094 A1 | 5/2014 | Kirby et al. |
| 2014/0147102 A1 | 5/2014 | Shartzer et al. |
| 2014/0189736 A1 | 7/2014 | Kummer et al. |
| 2014/0189739 A1 | 7/2014 | Kummer et al. |
| 2014/0196094 A1 | 7/2014 | Singh et al. |
| 2014/0201767 A1 | 7/2014 | Seiden et al. |
| 2014/0229972 A1 | 8/2014 | Kudelski |
| 2014/0282759 A1 | 9/2014 | Harvey et al. |
| 2014/0341377 A1 | 11/2014 | Kummer et al. |
| 2014/0344858 A1 | 11/2014 | Minnick |
| 2014/0363139 A1 | 12/2014 | Kirby |
| 2014/0376884 A1 | 12/2014 | Lovell |
| 2015/0040166 A1 | 2/2015 | Tamura et al. |
| 2015/0095948 A1 | 4/2015 | Kummer et al. |
| 2015/0104146 A1 | 4/2015 | Higuchi et al. |
| 2015/0121430 A1 | 4/2015 | Templeman |
| 2015/0208119 A1 | 7/2015 | Casagrande et al. |
| 2015/0208125 A1 | 7/2015 | Robinson |
| 2015/0228305 A1 | 8/2015 | Templeman et al. |
| 2015/0245089 A1 | 8/2015 | Protrebic |
| 2015/0245113 A1 | 8/2015 | Casagrande |
| 2015/0312513 A1 | 10/2015 | Kummer et al. |
| 2015/0319400 A1 | 11/2015 | Golyshko |
| 2016/0029082 A1 | 1/2016 | Wordley |
| 2016/0073144 A1 | 3/2016 | Robinson |
| 2016/0080800 A1 | 3/2016 | Casagrande |
| 2016/0105711 A1 | 4/2016 | Martch et al. |
| 2016/0134926 A1 | 5/2016 | Casagrande et al. |
| 2016/0234543 A1 | 8/2016 | Templeman |
| 2016/0249089 A1 | 8/2016 | Minnick |
| 2016/0323632 A1 | 11/2016 | Martch et al. |

FOREIGN PATENT DOCUMENTS

| | | |
|---|---|---|
| CN | 1926793 A | 3/2007 |
| CN | 101174946 A | 5/2008 |
| CN | 101202600 A | 6/2008 |
| CN | 101310532 A | 11/2008 |
| CN | 101 404 780 A | 4/2009 |
| CN | 101978690 A | 2/2011 |
| EP | 0 903 743 A | 3/1999 |
| EP | 0 973 333 A | 1/2000 |
| EP | 1 001 631 A1 | 5/2000 |
| EP | 1 168 347 A | 2/2002 |
| EP | 1372339 A2 | 12/2003 |
| EP | 1 447 983 A1 | 8/2004 |
| EP | 1 667 452 B1 | 7/2006 |
| EP | 1 742 467 A2 | 1/2007 |
| EP | 1 879 376 A2 | 1/2008 |
| EP | 2 018 059 A1 | 1/2009 |
| EP | 2 317 767 A1 | 5/2011 |
| EP | 2 357 563 A1 | 8/2011 |
| EP | 2 403 239 A1 | 1/2012 |
| EP | 2 541 929 A1 | 1/2013 |
| EP | 2 750 398 A1 | 7/2014 |
| EP | 2 826 197 A1 | 1/2015 |
| EP | 2 826 238 A1 | 1/2015 |
| GB | 2 459 705 A | 11/2009 |
| IN | 9740/CHENP/2013 A | 9/2014 |

(56) References Cited

FOREIGN PATENT DOCUMENTS

| IN | 7408/CHEN/2014 A | 1/2016 |
|---|---|---|
| IN | 9493/CHEN/2013 A | 6/2016 |
| JP | H07 75015 A | 3/1995 |
| JP | 2007 116525 A | 5/2007 |
| JP | 2009-130755 A | 6/2009 |
| JP | 2010165058 A | 7/2010 |
| WO | 98/12872 A1 | 3/1998 |
| WO | 01/24532 A1 | 4/2001 |
| WO | 02/41625 A1 | 5/2002 |
| WO | 2004/057610 A1 | 8/2004 |
| WO | 2007/047410 A2 | 4/2007 |
| WO | 2008/010118 A1 | 1/2008 |
| WO | 2008/010689 A1 | 1/2008 |
| WO | 2008/060486 A2 | 5/2008 |
| WO | 2011/081729 A1 | 7/2011 |
| WO | 2011/027236 A1 | 10/2011 |
| WO | 2012/003693 A1 | 1/2012 |
| WO | 2012/112928 A2 | 8/2012 |
| WO | 2013/028824 A2 | 2/2013 |
| WO | 2013/028829 A2 | 2/2013 |
| WO | 2013/028835 A1 | 2/2013 |
| WO | 2013/138606 A1 | 9/2013 |
| WO | 2013/138608 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |
| WO | 2016/066443 A1 | 5/2016 |
| WO | 2016/111817 A1 | 7/2016 |

OTHER PUBLICATIONS

U.S. Appl. No. 14/444,071, filed Jul. 28, 2014, Final Office Action mailed Apr. 27, 2016, all pages.
U.S. Appl. No. 14/863,143, filed Sep. 23, 2015, all pages.
U.S. Appl. No. 13/786,915, filed Mar. 6, 2013, Notice of Allowance mailed Jul. 19, 2016, all pages.
U.S. Appl. No. 14/757,606, filed Dec. 23, 2015, Notice of Allowance mailed Jul. 18, 2016, all pages.
U.S. Appl. No. 14/340,190, filed Jul. 24, 2014, Notice of Allowance mailed Aug. 22, 2016, all pages.
U.S. Appl. No. 14/043,617, filed Oct. 1, 2013, Non-Final Office Action mailed Sep. 29, 2016, all pages.
Office Action for European Application No. 12825147 dated Mar. 7, 2016, all pages.
First Office Action and Search Report from the State Intellectual Property Office (SIPO) for CN 201280031150.8, issued Aug. 3, 2016, 10 pages.
Decision to Grant from the State Intellectual Property Office (SIPO) for CN 201280031434.7, issued May 12, 2016, all pages.
Second Office Action issued by State Intellectual Property Office for CN 201280028697.2, issued Jul. 8, 2016, all pages.
First Office Action and Search Report for CN Appln No. 201280030476.9 issued Aug. 9, 2016, all pages.
Notice of Allowance mailed Jul. 21, 2016 for Mexican Patent Application No. MX/a/2015/10334, 1 page.
Notice of Allowance dated Jun. 3, 2016 for Mexican Patent Application No. MX/a/2015/009985, 1 page.
Notice of Allowance dated Jun. 6, 2016 for Mexican Patent Application No. MX/a/2015/015383, 1 page.
Author Unknown, "Digital Video Broadcasting (DVB); Specification for Service Information (SI) in DVB systems," ETSI EN 300 468 V1.1 (Jan. 2013), 172 pages.
Author Unknown, Digital Video Broadcasting (DVB); Content Protection and Copy Management (DVB-CPCM); Part 3: CPCM Usage State Information; European Broadcasting Union Union Europa de Radio-Television, ETSI TS 102 825-3 V1.1.1 (Jul. 2008), XP014042034, 28 pages.
Hee-Yong Kim et al., "DCT Domain Filter for ATV Down Conversion", Consumer Electronics, 1997. Digest of Technical Papers. ICCE., International Conference On, IEEE, Jun. 11, 1997, pp. 142-143, XP032381904, DOI: 10.1109/ICCE. 1997.625904, ISBN: 978-0-7803-3734-3.
International Search Report and Written Opinion of PCT/US2015/065934 mailed Apr. 8, 2016, all pages.
International Search Report and Written Opinion of PCT/EP2015/073937 mailed Apr. 15, 2016, all pages.
U.S. Appl. No. 13/786,915, filed Mar. 6, 2013, Final Rejection mailed May 12, 2016, 27 pages.
U.S. Appl. No. 14/757,606, filed Dec. 23, 2015, Non Final Rejection mailed Mar. 24, 2016, 33 pages.
U.S. Appl. No. 13/215,598, filed Aug 23, 2011 Notice of Allowance mailed May 24, 2016, all pages.
U.S. Appl. No. 13/801,968, filed Mar. 13, 2013 Notice of Allowance mailed Apr. 7, 2016, 33 pages.
U.S. Appl. No. 13/801,994, Final Office Action mailed May 4, 2016, 37 pages.
U.S. Appl. No. 14/529,989, filed Oct. 31, 2014, Final Rejection mailed May 6, 2016, 27 pages.
U.S. Appl. No. 14/043,617, filed Oct. 1, 2013, Final Office Action mailed May 6, 2016, 56 pages.
Notice of Allowance dated Jan. 15, 2016 for Mexican Patent Application No. MX/a/2014/009928, 1 page.
Notice of Allowance dated Dec. 16, 2015 for Mexican Patent Application No. MX/a/2014/009919, 1 page.
U.S. Appl. No. 14/695,188 Non Final Office Action mailed Dec. 30, 2016, all pages.
U.S. Appl. No. 14/043,617, filed Oct. 1, 2013, Notice of Allowance mailed Dec. 23, 2016, all pages.
U.S. Appl. No. 15/131,868, filed Apr. 18, 2016 Non-Final Office Action mailed Jan. 13, 2017, all pages.
Notice of Publication for BR 11 2013 032035-4 dated Dec. 20, 2016, 1 page.
Notice of Publication for BR 11 2013 032380-9 dated Jan. 3, 2017, 1 page.
Notice of Publication for BR 11 2013 032377-9 dated Jan. 3, 2017, 1 page.
First Office Action and Search Report for CN Appln No. 201380014409.2 issued on Oct. 9, 2016, all pages.
Office Action mailed Nov. 29, 2016 for EP 13 761 291.7, all pages.
Evans, Brent: "GeekTonic: Jan. 25, 2009-Feb. 1, 2009", Jan. 31, 2009, SP55322053, Retrieved from the Internet: URL: http://www.geektonic.com/2009_01_25_archive.html [retrieved on Nov. 23, 2016].
U.S. Appl. No. 14/444,071, filed Jul. 28, 2014, Non-Final Office Action mailed Dec. 2, 2016, all pages.
U.S. Appl. No. 14/863,143, filed Sep. 23, 2015 Notice of Allowance mailed Dec. 21, 2016, all pages.
U.S. Appl. No. 14/789,737, filed Jul. 1, 2015 Non-Final Rejection mailed Nov. 22, 2016, all pages.
Office Action for EP 13197477.6 mailed Nov. 24, 2016, all pages.
U.S. Appl. No. 14/860,366, Non-Final Office Action mailed Mar. 24, 2017, all pages.
U.S. Appl. No. 14/944,758, Non-Final Office Action mailed Jan. 25, 2017, all pages.
U.S. Appl. No. 15/141,304, Non-Final Office Action mailed Feb. 28, 2017, all pages.
Notice of Publication for BR 11 2013 032860-6 dated Jan. 24, 2017, 1 page.
Office Action for European Application No. 12825147 dated Aug. 23, 2016, all pages.
U.S. Appl. No. 14/340,190, filed Jul. 24, 2014, Final Rejection mailed Feb. 19, 2016, 54 pages.
U.S. Appl. No. 14/154,887, filed Jan. 14, 2014 Notice of Allowance mailed Jan. 21, 2016, 26 pages.
U.S. Appl. No. 13/288,002, filed Nov. 2, 2011 Final Rejection mailed Jan. 13, 2016, 22 pages.
U.S. Appl. No. 13/292,047, filed Nov. 8, 2011 Notice of Allowance mailed Jan. 29, 2016, 45 pages.
U.S. Appl. No. 13/215,598, filed Aug. 23, 2011 Non Final Office Action mailed Dec. 15, 2015, all pages.
U.S. Appl. No. 13/801,968, filed Mar. 13, 2013 Final Office Action mailed Nov. 19, 2015, all pages.

(56) References Cited

OTHER PUBLICATIONS

U.S. Appl. No. 14/589,090, Notice of Allowance mailed Feb. 9, 2016, 47 pages.
U.S. Appl. No. 14/338,114, filed Jul. 22, 2014 Notice of Allowance mailed Feb. 3, 2016, all pages.
Second Office Action for CN 201280031434.7, issued Dec. 23, 2015, 6 pages.
First Office Action issued by State Intellectual Property Office (SIPO) for CN 201280028697.2, issued Dec. 16, 2015, 11 pages.
Notice of Allowance received for Mexican Patent Appln. MX/a/2013/014991, mailed on Dec. 9, 2015, 1 page.
Notice of Allowance mailed Dec. 4, 2015 for Mexican Patent Application No. MX/a/2014/009723, 1 page.
Author Unknown, "EE Launches home TV service in UK," dated Oct. 8, 2014, 3 pages. Retrieved on Oct. 13, 2014 from http://www.bbc.com/news/technology-29535279.
Author Unknown, "EE TV It's simply great television," Accessed on Oct. 13, 2014, 11 pages. Retrieved from https//ee.co.uk/ee-and-me/ee-tv.
Author Unknown, "Move Networks is Delivering the Next Generation of Television," Move Networks, 2010, obtained online at http://movenetworks.com/, 2 pages.
Design and implementation of a multi-stream cableCARD with a high-speed DVB-common descrambler; Joonyoung Jung, Ohyung Kwon, Sooin Lee; In proceeding of: Proceedings of the 14th ACM International Conference on Multimedia, Santa Barbara, CA, USA, Oct. 23-27, 2006, 4 pages.
Jensen, Craig, "Fragmentation: the condition, the cause, the cure" 'Online!, Executive Software International, 1994; ISBN: 0964004909; retrieved from Internet: <URL:www.executive.com/fragbook/fragbook.htm>* Chapter: "How a disk works", Section: "The original problem". Retrieved on Jan. 9, 2014, 70 pages.
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.
Williams, Christopher, "EE to launch TV set-top box," dated Oct. 7, 2014, 2 pages. Retrieved on Oct. 13, 2014 from http://www.telegraph.co.uk/finance/newsbysector/mediatechnologyandtelecoms/telecoms/11147319/EE-to-launch-TV-set-top-box.html.
European Search Report for EP 13197477 dated Mar. 25, 2014, 2 pages.
Extended European Search Report for EP 12825080 dated Sep. 11, 2014, 10 pages.
Extended European Search Report for EP 12825521 dated Nov. 24, 2014, 7 pages.
Extended European Search Report for EP 12825474 dated Jan. 7, 2015, 6 pages.
Extended European Search Report for EP 12825430 dated Feb. 3, 2015, all pages.
International Search Report and Written Opinion of PCT/US2012/51992 dated Nov. 2, 2012, 15 pages.
International Search Report and Written Opinion of PCT/US2012/51987 dated Oct. 23, 2012, 20 pages.
International Search Report and Written Opinion of PCT/US2012/051984 dated Nov. 5, 2012, 13 pages.
International Search Report and Written Opinion of PCT/US2012/52002 dated Oct. 16, 2012, 17 pages.
International Search Report and Written Opinion of PCT/US2013/031432 dated May 28, 2013, 10 pages.
International Preliminary Report on Patentability for PCT/US2013/031432 dated Sep. 16, 2014, 9 pages.
International Search Report and Written Opinion of PCT/US2013/031445 dated May 24, 2013, 11 pages.
International Preliminary Report on Patentability for PCT/US2013/031445 dated Sep. 16, 2014, 10 pages.
International Preliminary Report on Patentability for PCT/US2012/052002 dated on Apr. 17, 2014, 10 pages.
International Search Report and Written Opinion of PCT/US2012/51964 dated Nov. 2, 2012, 13 pages.
International Search Report and Written Opinion of PCT/US2012/052011 dated Dec. 17, 2012, 44 pages.
International Search Report of PCT/KR2007/003521 dated Oct. 23, 2007, 22 pages.
International Search Report of PCT/IB2003/005737 dated Mar. 2, 2004, 21 pages.
International Preliminary Report on Patentability, PCT/US2012/052011, dated Mar. 6, 2014, 6 pages.
International Preliminary Report on Patentability, PCT/US2012/051984, dated Mar. 6, 2014, 8 pages.
International Preliminary Report on Patentability, PCT/US2012/051964, dated Apr. 10, 2014, 7 pages.
International Preliminary Report on Patentability, PCT/US2012/051992, dated Apr. 3, 2014, 7 pages.
International Preliminary Report on Patentability, PCT/US2012/051987, dated Mar. 6, 2014, 7 pages.
International Preliminary Report on Patentability for PCT/US2013/032176 dated Sep. 25, 2014, 7 pages.
International Search Report and Written Opinion of PCT/US2013/32176 dated Jun. 25, 2013, 15 pages.
International Search Report and Written Opinion of PCT/US2013/031565 dated May 31, 2013, 82 pages.
International Preliminary Report on Patentability for PCT/US2013/031565 dated Sep. 16, 2014, 18 pages.
International Preliminary Report on Patentability for PCT/US2013/031915 dated Sep. 16, 2014, 5 pages.
International Preliminary Report on Patentability for PCT/US2013/031440 dated Sep. 25, 2014, 8 pages.
International Search Report and Written Opinion of PCT/US2013/031915 dated Jun. 3, 2013, 7 pages.
International Search Report and Written Opinion of PCT/US2013/031440 dated May 30, 2013, 14 pages.
Office Action dated Feb. 20, 2015 for Mexican Patent Application MX/a/2013/014907 is not translated into English, 1 page.
The Office Action dated Nov. 7, 2014 for Mexican Patent Application No. MX/a/2013/014907 is not translated into English, 3 pages.
The Office Action dated Jan. 23, 2015 for Mexican Patent Application No. MX/a/2013/014671 is not translated into English, 3 pages.
The Office Action dated Nov. 6, 2014 for Mexican Patent Application No. MX/a/2013/014677 is not translated into English, 2 pages.
U.S. Appl. No. 13/833,728, filed Mar. 15, 2013, Non-Final Office Action dated Sep. 29, 2014, 34 pages.
U.S. Appl. No. 13/833,728, filed Mar. 15, 2013, Final Rejection dated Jan. 29, 2015, 31 pages.
U.S. Appl. No. 13/833,728, filed Mar. 15, 2013, Notice of Allowance dated Apr. 9, 2015, 21 pages.
U.S. Appl. No. 13/839,220, filed Mar. 12, 2013, Non-Final Office Action dated Sep. 26, 2014, 24 pages.
U.S. Appl. No. 13/839,220, filed Mar. 12, 2013, Final Office Action dated Jan. 21, 2015, 23 pages.
U.S. Appl. No. 13/149,852, filed May 31, 2011, Non-Final Office Action dated Dec. 12, 2012, 9 pages.
U.S. Appl. No. 13/149,852, filed May 31, 2011, Final Office Action dated Mar. 26, 2013, 13 pages.
U.S. Appl. No. 13/149,852, filed May 31, 2011, Notice of Allowance dated Jul. 11, 2013, 13 pages.
U.S. Appl. No. 13/215,598, filed Aug. 23, 2011, Non-Final Office Action dated Jun. 20, 2013, 15 pages.
U.S. Appl. No. 13/215,598, filed Aug. 23, 2011, Final Office Action dated Nov. 21, 2013, 23 pages.
U.S. Appl. No. 13/215,598, filed Aug. 23, 2011, Non-Final Office Action dated Feb. 6, 2014, 12 pages.
U.S. Appl. No. 13/215,598, filed Aug. 23, 2011 Non-Final Office Action dated Nov. 25, 2014, 18 pages.
U.S. Appl. No. 13/215,598, filed Aug. 23, 2011 Final Office Action dated Jul. 2, 2014, 22 pages.
U.S. Appl. No. 13/215,702, filed Aug. 23, 2011, Notice of Allowance dated Feb. 11, 2013, 13 pages.
U.S. Appl. No. 13/215,655, filed Aug. 23, 2011, Non-Final Office Action dated Sep. 6, 2013, 27 pages.

(56) References Cited

OTHER PUBLICATIONS

U.S. Appl. No. 13/215,655, filed Aug. 23, 2011, Final Office Action dated Dec. 18, 2013, 20 pages.
U.S. Appl. No. 13/215,916, filed Aug. 23, 2011, Notice of Allowance dated Jan. 4, 2013, 10 pages.
U.S. Appl. No. 13/286,157, filed Oct. 31, 2011, Non-Final Office Action dated Jan. 17, 2013, 20 pages.
U.S. Appl. No. 13/286,157, filed Oct. 31, 2011, Non-Final Office Action dated Jul. 25, 2013, 49 pages.
U.S. Appl. No. 13/286,157, filed Oct. 31, 2011, Notice of Allowance dated Feb. 3, 2014, 81 pages.
U.S. Appl. No. 13/288,002, filed Nov. 2, 2011, Non-final Office Action dated Sep. 26, 2013, 15 pages.
U.S. Appl. No. 13/288,002, filed Nov. 2, 2011, Final Office Action dated Mar. 27, 2014, 20 pages.
U.S. Appl. No. 13/291,014, filed Nov. 7, 2011, Non-Final Office Action dated Mar. 29, 2013, 21 pages.
U.S. Appl. No. 13/291,014, filed Nov. 7, 2011, Notice of Allowance dated Aug. 7, 2013, 16 pages.
U.S. Appl. No. 13/292,047, filed Nov. 8, 2011, Non-Final Office Action dated Jan. 18, 2013, 17 pages.
U.S. Appl. No. 13/292,047, filed Nov. 8, 2011, Final Office Action dated Aug. 19, 2013, 17 pages.
U.S. Appl. No. 13/292,047, filed Nov. 8, 2011 Final Office Action dated Jan. 13, 2015, 22 pages.
U.S. Appl. No. 13/294,005, filed Nov. 11, 2011 Notice of Allowance dated Oct. 31, 2014, 24 pages.
U.S. Appl. No. 13/294,005, filed Nov. 11, 2011 Non-Final Office Action dated May 20, 2014, 33 pages.
U.S. Appl. No. 13/294,005, filed Nov. 11, 2011, Non-Final Office Action dated Aug. 14, 2013, 32 pages.
U.S. Appl. No. 13/294,005, filed Nov. 11, 2011, Final Office Action dated Jan. 3, 2014, 29 pages.
U.S. Appl. No. 13/302,852, filed Nov. 22, 2011 Non-Final Rejection dated May 23, 2013, 19 pages.
U.S. Appl. No. 13/302,852, filed Nov. 22, 2011, Final Rejection dated Dec. 9, 2013, 23 pages.
U.S. Appl. No. 13/302,852, filed Nov. 22, 2011, Non-Final Rejection dated Sep. 2, 2014, 28 pages.
U.S. Appl. No. 13/302,852, filed Nov. 22, 2011, Final Rejection dated Mar. 30, 2015, 29 pages.
U.S. Appl. No. 13/324,831, filed Dec. 13, 2011, Non-Final Office Action dated Feb. 28, 2013, 23 pages.
U.S. Appl. No. 13/324,831, filed Dec. 13, 2011, Notice of Allowance dated Sep. 4, 2013, 22 pages.
U.S. Appl. No. 13/592,976, filed Aug. 23, 2012, Notice of Allowance dated Oct. 7, 2013, 18 pages.
U.S. Appl. No. 13/614,899, filed Sep. 13, 2012, Non-Final Office Action dated Feb. 5, 2013, 17 pages.
U.S. Appl. No. 13/614,899, filed Sep. 13, 2012, Non-Final Office Action dated May 20, 2014, 25 pages.
U.S. Appl. No. 13/614,899, filed Sep. 13, 2012, Non-Final Office Action dated Sep. 17, 2013, 17 pages.
U.S. Appl. No. 13/614,899, filed Sep. 13, 2012, Final Office Action dated Mar. 17, 2014, 41 pages.
U.S. Appl. No. 13/614,899, filed Sep. 13, 2012, Notice of Allowance dated Mar. 13, 2015, 35 pages.
U.S. Appl. No. 13/757,168, filed Feb. 1, 2013 Notice of Allowance dated Oct. 14, 2014, 28 pages.
U.S. Appl. No. 13/757,168, filed Feb. 1, 2013, Non Final Office Action dated Jun. 4, 2014, 23 pages.
U.S. Appl. No. 13/793,636, filed Mar. 11, 2013, Non-Final Office Action dated Sep. 29, 2014, 27 pages.
U.S. Appl. No. 13/793,636, filed Mar. 11, 2013, Notice of Allowance dated Jan. 28, 2015, 43 pages.
U.S. Appl. No. 13/795,914, filed Mar. 6, 2013 Notice of Allowance dated Jul. 21, 2014, 13 pages.
U.S. Appl. No. 13/795,914, filed Mar. 6, 2013 Final Office Action dated Apr. 3, 2014, 17 pages.
U.S. Appl. No. 13/795,914, filed Mar. 6, 2013, Non-Final Office Action dated Oct. 11, 2013, 17 pages.
U.S. Appl. No. 13/797,173, filed Mar. 12, 2013 Notice of Allowance dated Nov. 24, 2014, 37 pages.
U.S. Appl. No. 13/797,173, filed Mar. 12, 2013 Notice of Allowance dated Feb. 26, 2015, 19 pages.
U.S. Appl. No. 13/797,173, filed Mar. 12, 2013, Non Final Office Action dated May 15, 2014, 28 pages.
U.S. Appl. No. 13/799,604, filed Mar. 13, 2013, Final Office Action dated Jan. 14, 2015, 36 pages.
U.S. Appl. No. 13/799,604, filed Mar. 13, 2013, Non Final Office Action dated Jun. 6, 2014, 24 pages.
U.S. Appl. No. 13/799,653, filed Mar. 13, 2013 Notice of Allowance dated Nov. 26, 2014, 32 pages.
U.S. Appl. No. 13/799,653, filed Mar. 13, 2013, Non Final Office Action dated May 8, 2014, 24 pages.
U.S. Appl. No. 13/799,719, filed Mar. 13, 2013, Non Final Office Action dated Oct. 25, 2013, 79 pages.
U.S. Appl. No. 13/799,719, filed Mar. 13, 2013, Notice of Allowance dated Apr. 23, 2014, 141 pages.
U.S. Appl. No. 13/800,477, filed Mar. 13, 2013 Non-Final Office Action dated Sep. 11, 2014, 34 pages.
U.S. Appl. No. 13/800,477, filed Mar. 13, 2013 Notice of Allowance dated Feb. 18, 2015, 18 pages.
U.S. Appl. No. 13/828,001, filed Mar. 14, 2013, Notice of Allowance dated Apr. 25, 2014, 43 pages.
U.S. Appl. No. 13/829,350, filed Mar. 14, 2013, Non Final Office Action dated Feb. 28, 2014, 29 pages.
U.S. Appl. No. 13/829,350, filed Mar. 14, 2013 Non Final Office Action dated Jul. 29, 2014, 24 pages.
U.S. Appl. No. 13/829,350, filed Mar. 14, 2013 Final Office Action dated Jan. 23, 2015, 18 pages.
U.S. Appl. No. 13/856,752, filed Apr. 4, 2013 Non Final Office Action dated Nov. 5, 2014, 34 pages.
U.S. Appl. No. 13/856,752, filed Apr. 4, 2013 Notice of Allowance dated Feb. 10, 2015, 20 pages.
U.S. Appl. No. 13/888,012, filed May 6, 2013 Non-Final Rejection dated Apr. 6, 2015, 36 pages.
U.S. Appl. No. 14/043,617, filed Oct. 1, 2013 Non-Final Office Action dated Jan. 5, 2015, 45 pages.
U.S. Appl. No. 14/060,388, filed Oct. 22, 2013, Notice of Allowance dated Apr. 13, 2015, 44 pages.
U.S. Appl. No. 14/064,423, filed Oct. 28, 2013, Non-Final Office Action dated Dec. 20, 2013, 18 pages.
U.S. Appl. No. 14/064,423, filed Oct. 28, 2013, Notice of Allowance dated Mar. 4, 2013, 37 pages.
U.S. Appl. No. 14/095,860, filed Dec. 3, 2013 Non-Final Office Action dated Dec. 26, 2014, 45 pages.
U.S. Appl. No. 13/215,598, filed Aug. 23, 2011 Final Office Action dated May 5, 2015, 17 pages.
U.S. Appl. No. 13/801,968, filed Mar. 13, 2013 Non Final Office Action dated May 21, 2015, 49 pages.
U.S. Appl. No. 14/095,860, filed Dec. 3, 2013 Final Office Action dated May 1, 2015, 18 pages.
European Search Report for EP 12825653 dated Mar. 11, 2015, 7 pages.
Supplementary European Search Report for Application No. EP 12825147 dated Mar. 27, 2015, 9 pages.
The second Office Action dated Feb. 26, 2015 for Mexican Pat. Appln. No. MX/a/2013/014217 is not translated into English, 3 pages.
The Notice of Allowance by the Mexican Institute of Industrial Property for Mexican Patent Application No. MX/a/2013/014677 dated Mar. 19, 2015 is not translated into English, 1 page.
The Notice of Allowance by the Mexican Institute of Industrial Property for Mexican Patent Application No. MX/a/2013/014671 dated Apr. 17, 2015, 1 page.
U.S. Appl. No. 13/799,604, filed Mar. 13, 2013, Notice of Allowance dated May 29, 2015, 46 pages.
U.S. Appl. No. 14/340,190, filed Jul. 24, 2014, Non-Final Rejection dated Aug. 31, 2015, 74 pages.
Office Action dated Jul. 31, 2015 for Mexican Patent Application No. MX/a/2014/009928, 2 pages.

(56) References Cited

OTHER PUBLICATIONS

International Search Report and Written Opinion for PCT/GB2015/052022, dated Oct. 8, 2015, all pages.
Office Action dated Jul. 31, 2015 for Mexican Patent Application No. MX/a/2014/009919, 2 pages.
Supplementary European Search Report for EP 13760902, dated Oct. 20, 2015, all pages.
Supplementary European Search Report for EP 13761427, dated Oct. 19, 2015, all pages.
U.S. Appl. No. 13/786,915, filed Mar. 6, 2013, Non Final Rejection dated Oct. 15, 2015, 59 pages.
U.S. Appl. No. 13/801,994, Non Final Office Action dated Oct. 7, 2015, 55 pages.
U.S. Appl. No. 14/095,860, filed Dec. 3, 2013, Notice of Allowance dated Oct. 19, 2015, 14 pages.
U.S. Appl. No. 14/338,114, filed Jul. 22, 2014, Non-Final Office Action dated Sep. 30, 2015, all pages.
U.S. Appl. No. 14/529,989, filed Oct. 31, 2014, Non-Final Office Action dated Nov. 4, 2015, all pages.
U.S. Appl. No. 14/043,617, filed Oct. 1, 2013, Non-Final Office Action dated Oct. 23, 2015, all pages.
U.S. Appl. No. 14/676,137, filed Apr. 1, 2015, Notice of Allowance dated Sep. 28, 2015, 35 pages.
U.S. Appl. No. 14/444,071, filed Jul. 28, 2014, Non-Final Office Action dated Oct. 22, 2015, 24 pages.
U.S. Appl. No. 14/467,959, filed Aug. 25, 2014 Notice of Allowance dated Jun. 22, 2015, 36 pages.
U.S. Appl. No. 14/154,887, filed Jan. 14, 2014 Non-Final Rejection dated Jul. 17, 2015, 33 pages.
U.S. Appl. No. 14/095,860, filed Dec. 3, 2013 Notice of Allowance dated Jul. 13, 2015, 31 pages.
U.S. Appl. No. 14/043,617, filed Oct. 1, 2013 Final Office Action dated Jul. 16, 2015, 45 pages.
U.S. Appl. No. 13/888,012, filed May 6, 2013 Notice of Allowance dated Jul. 14, 2015, 18 pages.
U.S. Appl. No. 13/829,350, filed Mar. 14, 2013 Notice of Allowance dated Jul. 24, 2015, 29 pages.
U.S. Appl. No. 13/302,852, filed Nov. 22, 2011 Notice of Allowance dated Jun. 19, 2015, 26 pages.
U.S. Appl. No. 13/292,047, filed Nov. 8, 2011 Non-Final Office Action dated Jul. 7, 2015, 28 pages.
U.S. Appl. No. 13/288,002, filed Nov. 2, 2011 Non Final Rejection dated Jul. 28, 2015, 29 pages.
Supplementary European Search Report for EP 13761291.7 dated Jul. 9, 2015, 8 pages.
Office Action dated May 18, 2015 for Mexican Patent Application No. MX/a/2014/009776, 2 pages.
Office Action dated May 12, 2015 for Mexican Patent Application No. MX/a/2014/009723, 2 pages.
Extended European Search Report for EP 13760237.1 dated Jul. 21, 2015, 8 pages.
First Office Action and Search Report from the State Intellectual Property Office (SIPO) for CN 201280031434.7, dated Jul. 17, 2015, 12 pages.
U.S. Appl. No. 13/839,220, filed Mar. 12, 2013, Notice of Allowance dated Jun. 3, 2015, 22 pages.
U.S. Appl. No. 13/799,604, filed Mar. 13, 2013, Notice of Allowance dated Jul. 24, 2015, 34 pages.

\* cited by examiner

SINGLE FILE PVR PER SERVICE ID

CROSS-REFERENCES TO RELATED APPLICATIONS

N/A

BACKGROUND

Television viewers may watch and/or record broadcast television programs at their television receivers, such as via personal video recorder ("PVR") capabilities offered by most television receivers. Typically, for each watching and/or recording event, a separate file is saved to a hard drive, even if media contents for the watching and/or recording events are received via a common service identification ("ID"), e.g. on the same television channel. Such saved data may include watching data, such as buffers temporarily saved for a user viewing television programs, and/or recording data, such as pre-scheduled and/or manually initiated event recordings. Often, duplicate data is recorded, which may complicate the recording by requiring additional memory and handling by the television receiver. Further, recordings may be truncated or skipped. This invention is intended to address such issues and to provide related advantages.

SUMMARY

In general, systems and methods disclosed herein are directed to recording media contents, and more particularly, to recording television programs received at a common television channel to a single recording file.

In one aspect, a method for recording multiple broadcast television programs to a single file may include receiving, by a television receiver, user selection for recording a first media content and a second media content. The method may include determining, by the television receiver, the first media content and the second media content are provided on a single television service, and/or tuning, by the television receiver, to the television service to receive the first media content via a tuner of the television receiver. Further, the method may include recording, by the television receiver, the first media content as a first permanent recording to a master file, receiving, by the television receiver, the second media content via the tuner of the television receiver, and/or recording, by the television receiver, the second media content as a second permanent recording to the master file.

Various embodiments of the method may include one or more of the following features. The first media content and the second media content may be received consecutively at the same tuner of the television receiver. The method may include recording, by the television receiver, additional media contents received at the single television service as additional permanent recordings. The single television service may include a single television channel. Further, the user selection for recording at least one of the first and second media contents may include at least one of a scheduled recording and an event recording. The event recording may include receiving a user input to record media content while the media content is being output, by the television receiver, to a display device. In some cases, the method includes detecting, by the television receiver, manual initiation of a record function via a remote control for the user selection of the event recording.

Further features of the method may include recording, by the television receiver, a soft trim segment of media content immediately preceding the first permanent recording. The soft trim segment may be received at the tuner prior to a timer starting for the first permanent recording. The method may include removing, by the television receiver, the recorded soft trim segment from the master file. The method may include recording, by the television receiver, at least one non-permanent segment of media content received at the tuner after recording the first media content and before recording the second media content. The non-permanent segment may be recorded to the master file between an end of the first permanent recording and a beginning of the second permanent recording. Further, the method may include removing, by the television receiver, the at least one recorded non-permanent segment from the master file.

Further, the method may include removing, by the television receiver, the at least one recorded non-permanent segment from the master file in response to detecting, by the television receiver, that the single television service is no longer being accessed for at least one of viewing and recording. In some cases, the method includes determining, by the television receiver, that the single television service is no longer being accessed by detecting, by the television receiver, that no tuners located on least one of the television receiver and secondary television receivers in operative communication with the television receiver are accessing the single television service for at least one of viewing and recording.

The method may include creating, by the television receiver, a first virtual file corresponding to the first permanent recording and a second virtual file corresponding to the second permanent recording, whereby each of the first and second virtual files may include metadata indicating a location in the master file for the first or second permanent recordings, respectively. The metadata of each of the first and second virtual files may include presentation timestamps ("PTS") corresponding to a start time and an end time of the first and second permanent recordings, respectively. The first virtual file and the second virtual file may indicate portions of the master file that are not deleted upon closing, by the television receiver, the master file.

Still further, the method may include creating, by the television receiver, a delay buffer file mirroring the master file, and/or deleting, by the television receiver, the delay buffer file upon detecting, by the television receiver, that the single television service is no longer being accessed for at least one of viewing and recording. The method may include recording, by the television receiver, the delay buffer file upon tuning to the television service to receive the first media content. In some cases, the method may include deleting, by the television receiver, the delay buffer upon detecting that the master file is closed. Detecting that the master file is closed may include receiving, by the television receiver, a user selection to power down the television receiver. The master file may include a transport stream .tsp file that is written to a local hard drive at the television receiver.

In another aspect, a computer-readable medium having stored thereon a series of instructions which, when executed by a processor, cause the processor to record multiple television programs to a single file may include receiving, by a television receiver, user selection for recording a first media content and a second media content, and/or determining, by the television receiver, the first media content and the second media content are provided on a single television service. The instructions may include tuning, by the television receiver, to the television service to receive the first media content via a tuner of the television receiver and/or recording, by the television receiver, the first media content as a first permanent recording to a master file. Further, the method may include receiving, by the television receiver, the second media content via the tuner of the television receiver, and/or recording, by the television receiver, the second media content as a second permanent recording to the master file.

In yet another aspect, a system for recording multiple television programs to a single file may include one or more processors and a memory communicatively coupled with and readable by the one or more processors and having stored therein processor-readable instructions. When executed by the one or more processors, the processor-readable instructions may cause the one or more processor to receive, by a television receiver, user selection for recording a first media content and a second media content, and/or determine, by the television receiver, the first media content and the second media content are provided on a single television service. The processor-readable instructions may cause the one or more processor to tune, by the television receiver, to the television service to receive the first media content via a tuner of the television receiver, and/or record, by the television receiver, the first media content as a first permanent recording to a master file. Further, the processor-readable instructions may cause the one or more processors to receive, by the television receiver, the second media content via the tuner of the television receiver, and/or record, by the television receiver, the second media content as a second permanent recording to the master file.

It is noted that any of the elements and/or steps provided in the block diagrams, flow diagrams, method diagrams, and other illustrations of the figures may be optional, replaced, and/or include additional components, such as combined and/or replaced with other elements and/or steps from other figures and text provided herein. Various embodiments of the present invention are discussed below, and various combinations or modifications thereof may be contemplated.

DETAILED DESCRIPTION

In general, the systems and methods disclosed herein may record different television programs received at a common television channel, herein referred to as a common service identification ("ID"), to a single master file. Further, the systems and methods disclosed herein may clean-up the master file by removing unnecessary and/or non-permanent recordings upon detection that the service ID is no longer being accessed by any tuners at the television receiver, and/or by any secondary television receivers connected thereto. Other variations and embodiments are possible, as disclosed herein.

Numerous benefits of the systems and methods may be contemplated. The systems and methods disclosed herein may reduce and/or eliminate duplicate data, such as duplicate recordings of media content being permanently and/or temporarily stored to the television receiver during viewing and/or recording of media contents. By way of example, such saved data may include watching data, such as buffers temporarily saved for a user viewing television programs, and/or recording data, such as pre-scheduled and/or manually initiated event recordings. In this way, complexity of the recordings may be reduced, along with reduced system requirements for handling and storing the recorded files.

In another aspect, a number of tuners required for a plurality of viewing and/or recording events may be reduced by providing the common, master file as accessible by a plurality of television receivers, e.g. primary and additional television receivers, and/or other user devices having similar capabilities. In this way, fewer tuners may be required for watching and/or recording media content, which may reduce possibilities of programs being truncated and/or skipped due to back to back timers operating on the same service ID. In further aspects, buffering the video stream received at the service ID may be simplified by the systems and methods disclosed herein. Other benefits may be contemplated.

Figure 1:
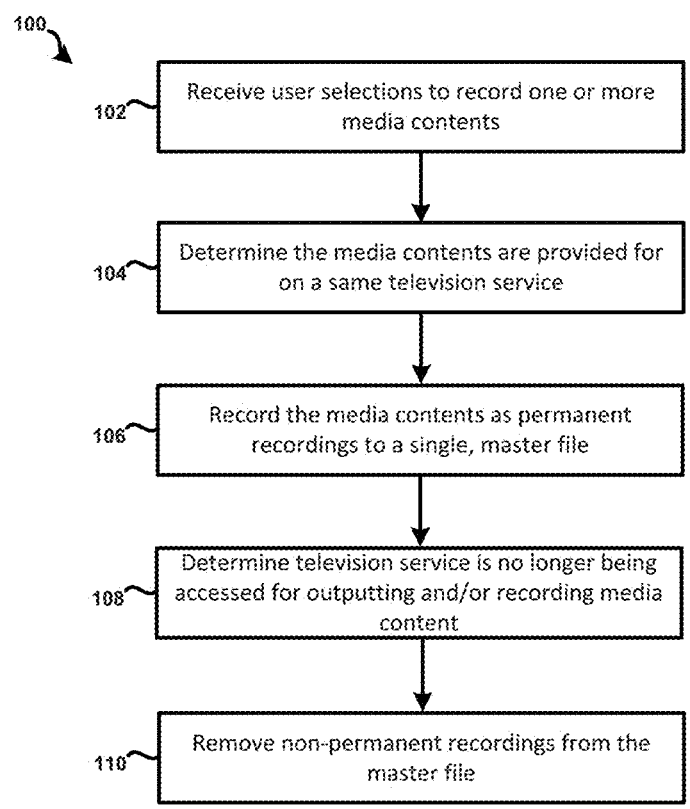
FIG. 1 shows an example method according to the present disclosure.

Turning now to FIG. 1, an example method 100 for providing a single file PVR per service ID is provided. The method 100 may be implemented by a television receiver, and/or any other device that may receive and/or record media content. Further, the method 100 shown, and any other methods disclosed herein, may include additional and/or alternative steps in relation to the steps being shown. Any of the steps may be optional, rearranged, and/or combined. Numerous variations are possible.

As shown in FIG. 1, the method 100 may include receiving, by a television receiver, user selection(s) to record one or more media contents (step 102). In some examples, the television receiver may receive user selection for recording a plurality of media contents, such as a plurality of broadcast television programs. In one example, the television receiver receives instruction and/or action from a user to record a first media content and a second media content, although several additional media contents may be designated by the user(s) for recording. The user selection for recording media contents may include a scheduled recording, such as recordings that are scheduled by user input and specified with a broadcast channel and/or broadcast time. In other cases, the user selection for recording may include an event recording, whereby the television receives user input to record media content while the media content is being output, by the television receiver, to a display device or television screen. An example of such user input may include detecting, by the television receiver, manual initiation of a record function via a remote control during the output of the media content for viewing. For instance, the user may press a record button on the television receiver and/or a remote control connected thereto.

It is noted that the television receiver contemplated herein may include personal video recorder ("PVR") or digital video recorder ("DVR") services, although other variations are possible. Further, it is noted that secondary television receivers may also receive user selection to record one or more media contents, and/or to view the one or more media contents. Such requests handled at the secondary television receivers may be communicated to a primary television receiver, such as the television receiver contemplated herein for example purposes. In this way, the main or primary television receiver may detect if the additional secondary television receivers are recording and/or watching, e.g. being output for display, media contents, which may be provided for on a same service identification ("ID"), e.g. same television channel, as the first and second media contents being recorded. For instance, the television receiver may detect if a user at a secondary television receiver has tuned in to the same service ID while a scheduled and/or event recording is occurring at the primary television receiver. Other examples are possible.

As further shown in FIG. 1, the method 100 may include determining, by the television receiver, that the media contents selected for recording are provided for on a same television service (step 104). For instance, the television receiver may determine that the first media content and the second media content are provided on a single television service, such as a single or same television channel or service ID. For instance, the first and second media contents may be received consecutively at the same tuner of the television receiver. In some cases, the first and second media contents may be received back-to-back at the same tuner and/or television channel. In other cases, the first and second media contents may be separated in the video stream of the single television channel by other programs, which may not be specifically designated for recording by the user. It is contemplated that the first and second media contents may include first and second television programs that are schedule and/or event recorded, or a combination thereof. Further, the television receiver may determine that a plurality of media contents that have been chosen for recording are provided for on the same service ID. Other examples are possible.

Further shown in FIG. 1, the method 100 may include recording, by the television receiver, the media contents as permanent recordings to a single, master file (step 106). For instance, the method 100 may include tuning, by the television receiver, to the television service to receive the first media content via a tuner of the television receiver, and recording, by the television receiver, the first media content as a first permanent recording to the master file. Subsequently, the method 100 may include receiving, by the television receiver, the second media content via the tuner of the television receiver, and recording, by the television receiver, the second media content as a second permanent recording to the master file. If additional media content is designated for recording and determined to be provided on the same service ID, the television receiver may further record the additional media contents as additional permanent recordings on the master file.

In some cases, as mentioned above, other programs that are not intended for recording are provided for on the service ID. Such recordings may include intermediary segments of video content that exist before, in-between, and/or after the desired media contents to be permanently recorded. It is contemplated that the other programs may also be recorded to the master file as non-permanent segments which may be automatically deleted from the master file at a later time, as discussed below. In a specific example, the television receiver may record at least one non-permanent segment of media content received at the tuner after recording the first media content and before recording the second media content. In that case, the non-permanent segment may be recorded to the master file between an end of the first permanent recording and a beginning of the second permanent recording. The television receiver may remove, e.g. automatically delete, the at least one recorded non-permanent segment from the master file upon detection of one or more events during a clean-up routine, as described in further detail below.

In a further aspect, prior to recording the first media content, the television receiver may record, temporarily, a soft trim segment of media content, whereby the soft trim segment immediately precedes the first permanent recording. The soft trim segment may be received at the tuner prior to a timer starting for the first permanent recording, e.g. upon tuning to the single television channel in preparation for recording the first media content. Merely by way of example, tuning to the single television channel may include a user tuning to the channel and/or the television receiver automatically tuning to the channel based on a preprogrammed, scheduled recording. It is noted that the television receiver may actively remove, while performing the recordings, the recorded soft trim segment from the master file. It is further noted that the master file may include a transport stream file or .tsp file. Other file formats that may be common for digital television PVR and/or DVR may be contemplated. Merely by way of example, the master file may also be provided as a .wtt file, .art file, and/or a .bm file.

In another aspect, during, after, and/or otherwise in relation to the recording of the first and/or second media contents, the television receiver may create virtual files linked to each of the permanent recordings. For instance, the television receiver may create a first virtual file corresponding to the first permanent recording and a second virtual file corresponding to the second permanent recording. It is contemplated that the virtual files each contain metadata also created by the television receiver to indicate a location in the master file for the recording linked thereto. It is contemplated that the virtual files are only created for permanent recordings, i.e. the first, second, and/or any other additional permanent recordings. The virtual files may be accessed by the television receiver for locating the permanent recordings when the television receiver receives user input to view a particular recording, and/or for indicating which recordings should or should not be deleted. For example, non-permanent segments that are recorded do not have an associated virtual file(s), which may indicate that they are removable, as discussed further in the steps below.

In some examples, the metadata of each virtual file includes presentation timestamps ("PTS") corresponding to a start time and an end time of the permanent recording to determine a location of the permanent recording in the master file. The PTS data may be included in the video stream received at the tuner and may be parsed out by the television receiver for determining the metadata. In another example, the metadata may include storing a byte offset into or related to the recording in the master file. For instance, instead of searching and parsing for PTS data, the television receiver may provide metadata that indicates that the permanent recording begins at a position that is 30 bytes into the file. It is contemplated that the television receiver may implement such PTS and/or byte count data as metadata to indicate or otherwise determine a location of the permanent recording in the master file. In other aspects, similar concepts may be used to identify which portions of the video stream received at the tuner should be permanently recorded.

In a further aspect, a delay buffer file may be created during viewing and/or recording of the service ID. The viewing and/or recording may be performed by the television receiver, and/or one or more secondary television receivers connected thereto. It is contemplated that the delay buffer file may be created and/or begin to be recorded by the television receiver at a moment coinciding with the television receiver tuning to the service ID in preparation for receiving the first media content. The delay buffer file may be maintained and updated until the television receiver detects that the tuner at the receiver, and/or any other secondary television receivers connected thereto, are no longer accessing the service ID for any viewing and/or recording purposes, whereupon the delay buffer file may be deleted. In another aspect, the delay buffer file may be deleted by the television receiver upon detecting that the master file has been closed and/or is no longer being accessed by any television receivers. It is noted that the delay buffer file may comprise a temporary recording file that is separate from the master file. In another aspect, the delay buffer file may mirror the master file while both are being recorded and/or created by the television receiver.

Further shown in FIG. 1, the method 100 may include determining, by the television receiver, that the television service or service ID is no longer being accessed for watching and/or recording media content (step 108). In some cases, determination of this stage may be based on an access status of each of the television receivers, such as the television receiver and secondary television receivers connected thereto. The access status may indicate that the television receiver is powered off, is receiving the media content for watching and/or recording, and/or specify if the television receiver is on standby but still operably performing a scheduled recording. In a particular example, when the television receiver detects that a last permanent recording has been completed and that a last television viewer, e.g. television receiver, of the service ID has left the service ID, the television receiver may determine that the service ID is no longer being accessed by any of the television receivers. Leaving the service ID may include changing to a different television channel and/or powering down the television receiver delivering to the last television viewer. Further, it is noted that a television receiver in standby mode that is recording, or has a scheduled recording for, a television program on the service ID is considered to be accessing the service ID. Other examples are possible.

Still further shown in FIG. 1, the method 100 may include removing non-permanent recordings from the master file (step 110). For example, the television receiver may remove, e.g. automatically delete, the at least one recorded non-permanent segment from the master file upon detecting that the service ID is no longer being accessed (step 108) and/or determining that the master file has been closed, e.g. the master file is no longer being accessed and/or written to. In some cases, the television receiver closes the master file in response to determining that the service ID is no longer being accessed by any television receivers networked together, and/or closes the master file due to powering off the last television receiver accessing it. In any case, during the clean-up routine of step 110, virtual files associated with the permanent recordings in the master file, e.g. the first and second virtual files, may indicate which portions of the master file that are not to be deleted upon closing of the master file.

It is contemplated that during the clean-up routine, which may herein be referred to as hole-punching the master file, non-permanent segments are fully deleted after everyone, i.e. all television receivers, leaves the particular service ID, including any scheduled recordings taking place or scheduled to take place on the service ID. For example, the service ID may be television channel 5, whereby once channel 5 is no longer in use by any users, i.e. any scheduled recording timers or active watchers, the television receiver may initiate the final clean-up of the master file by permanently deleting the unmarked, e.g. lacking a corresponding virtual file, recorded sections or non-permanent segments of the master file. As noted above, this process may be referred to as "hole punching" since the non-permanent segments of the master file occur in-between or are otherwise located intermediately between two separate permanent recordings on the master file. Other possibilities may include hole punching to remove other recorded portions of the media content, such as a soft trim portion which precedes the first permanent recording and/or a current delay buffer which follows the last permanent recording. Further, it is contemplated that the permanent recordings are not shifted, condensed together, and/or otherwise or repositioned in the master file after hole punching the non-permanent segments of the master file, although other examples may be contemplated.

In still another example, the first permanent recording and the second permanent recoding may be back-to-back on the master file and created by using back-to-back recording timers. In that case, a beginning of one show, e.g. the second permanent recording, may overlap an end of another show, e.g. the first permanent recording, such that no intermediary, non-permanent recordings are in the master file. In a further aspect, the television receiver may receive user indication to delete one of the first or second permanent recordings. In that case, any portion of the recording intended for deletion that does not overlap with the remaining recording may be hole-punched out of the master file.

In another aspect, the delay buffer file may be deleted during the file clean-up. It is contemplated that the delay buffer file is created as soon as the service ID is tuned to by the television receiver, and continues to be maintained and created until the master file has closed and all users have left the service ID. When the service ID is no longer being accessed by any of the television receivers, e.g. primary and secondary television receivers, then the delay buffer file may be deleted. In this way, the delay buffer file may be active as long as the master file is active, e.g. not yet closed. In practice, the delay buffer file may be any length, and may include an actual viewable portion that can be accessed by a viewer for skipping back and/or forward within an actual viewable window, such as a 60 minute window from live broadcast. The length or size of the actual viewable window and/or delay buffer file may be user configured, pre-programmed, and/or dependent on an available storage space at the television receiver. Other examples are possible.

Figure 2:
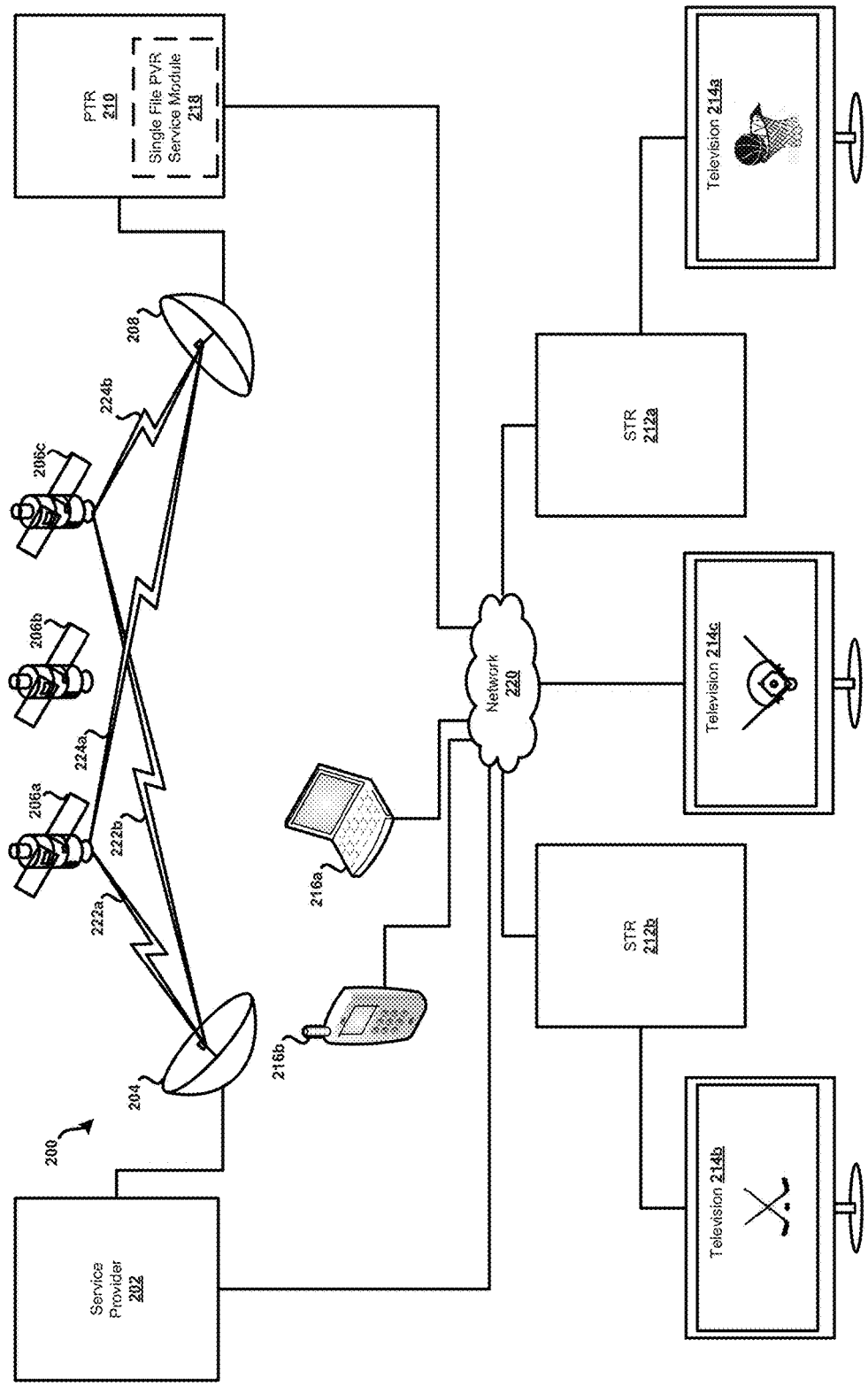
FIG. 2 shows an example satellite system according to the present disclosure.

Turning now to FIG. 2, an example satellite system 200 is shown in accordance with the present disclosure. For brevity, the satellite system 200 is depicted in a simplified form, and may generally include more or fewer systems, devices, networks, and/or other components as desired. Further, number and type of features or elements incorporated within the satellite system 200 may or may not be implementation-specific, and at least some of the aspects of the satellite system 200 may be similar to a cable television distribution system, an IPTV (Internet Protocol Television) content distribution system, and/or any other type of content distribution system.

In this example, the satellite system 200 may include a service provider 202, a satellite uplink 204, a plurality of orbiting (e.g., geosynchronous) satellites 206a-c, a satellite dish 208, a PTR (Primary Television Receiver) 210, a plurality of STRs (Secondary Television Receivers) 212a-b, a plurality of televisions 214a-c, and a plurality of computing devices 216a-b. The PTR 210 may include a single file PVR service module 218 that is programmatically configured to provide a single file PVR per service ID. As discussed throughout, the single file PVR service module 218 may be provided according to a particular hardware and/or firmware architecture of the PTR 210. Such implementations may be beneficial and/or advantageous in many respects, as described further in the succeeding paragraphs.

The satellite system 200 may also include at least one network 220 that establishes a bi-directional communication path for data transfer between and among each respective element of the satellite system 200 outside of the unidirectional satellite signaling path. The network 220 is intended to represent any number of terrestrial and/or non-terrestrial network features or elements. For example, the network 220 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the satellite system 200.

The PTR 210, and the STRs 212a-b, as described throughout may generally be any type of television receiver, television converter, etc., such as a STB (Set-Top-Box) for example. In another example, the PTR 210, and the STRs 212a-b, may exhibit functionality integrated as part of or into a television, a DVR, a computer such as a tablet computing device, or any other computing system or device, as well as variations thereof. Further, the PTR 210 and the network 220, together with the STRs 212a-b and televisions 214a-c, and possibly the computing devices 216a-b, may be incorporated within or form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example satellite system 200 may be configured to communicate in accordance with the MoCA® (Multimedia over Coax Alliance) home entertainment networking standard. Still other examples are possible.

In practice, the satellites 206a-c may each be configured to receive uplink signals 222a-b from the satellite uplink 204. In this example, the uplink signals 222a-b may contain one or more transponder streams of particular data or content, such as particular television channel, that is supplied by the service provider 202. For example, each of the respective uplink signals 222a-b may contain various media content such as a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c. Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc.

The satellites 206a-c may further be configured to relay the uplink signals 222a-b to the satellite dish 208 as downlink signals 224a-b. Similar to the uplink signals 222a-b, each of the downlink signals 224a-b may contain one or more transponder streams of particular data or content, such as various encoded and/or at least partially electronically scrambled television channels, on-demand programming, etc., in accordance with an allotted carrier frequency and bandwidth. The downlink signals 224a-b, however, may not necessarily contain the same or similar content as a corresponding one of the uplink signals 222a-b. For example, the uplink signal 222a may include a first transponder stream containing at least a first group or grouping of television channels, and the downlink signal 224a may include a second transponder stream containing at least a second, different group or grouping of television channels. In other examples, the first and second group of television channels may have one or more television channels in common. In sum, there may be varying degrees of correlation between the uplink signals 222a-b and the downlink signals 224a-b, both in terms of content and underlying characteristics.

Continuing with the example implementation-specific scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 224a-b, from one or more of the satellites 206a-c. Based on the characteristics of the PTR 210 and/or satellite dish 208, however, it may only be possible to capture transponder streams from a limited number of transponders concurrently. For example, a tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. In this example, the HD channel may be output to the television 214c in accordance with the HDMI/HDCP content protection technologies. Other examples are possible.

Further, the PTR 210 may select via tuner, decode, and relay particular transponder streams to one or both of the STRs 212a-b, which may in turn relay particular transponder streams to a corresponding one of the television 214a and the television 214b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of STR 212a in accordance with a particular content protection technology and/or networking standard. Still further, the satellite dish 208 and the PTR 210 may, respectively, be configured to receive, decode, and relay at least one premium television channel to one or both of the computing devices 216*a-b*. Similar to the above-examples, the television channel may generally be presented live, or from a recording as previously stored on the PTR 210, and may be output to one or both of the computing devices 216*a-b* in accordance with a particular content protection technology and/or networking standard.

Figure 3:
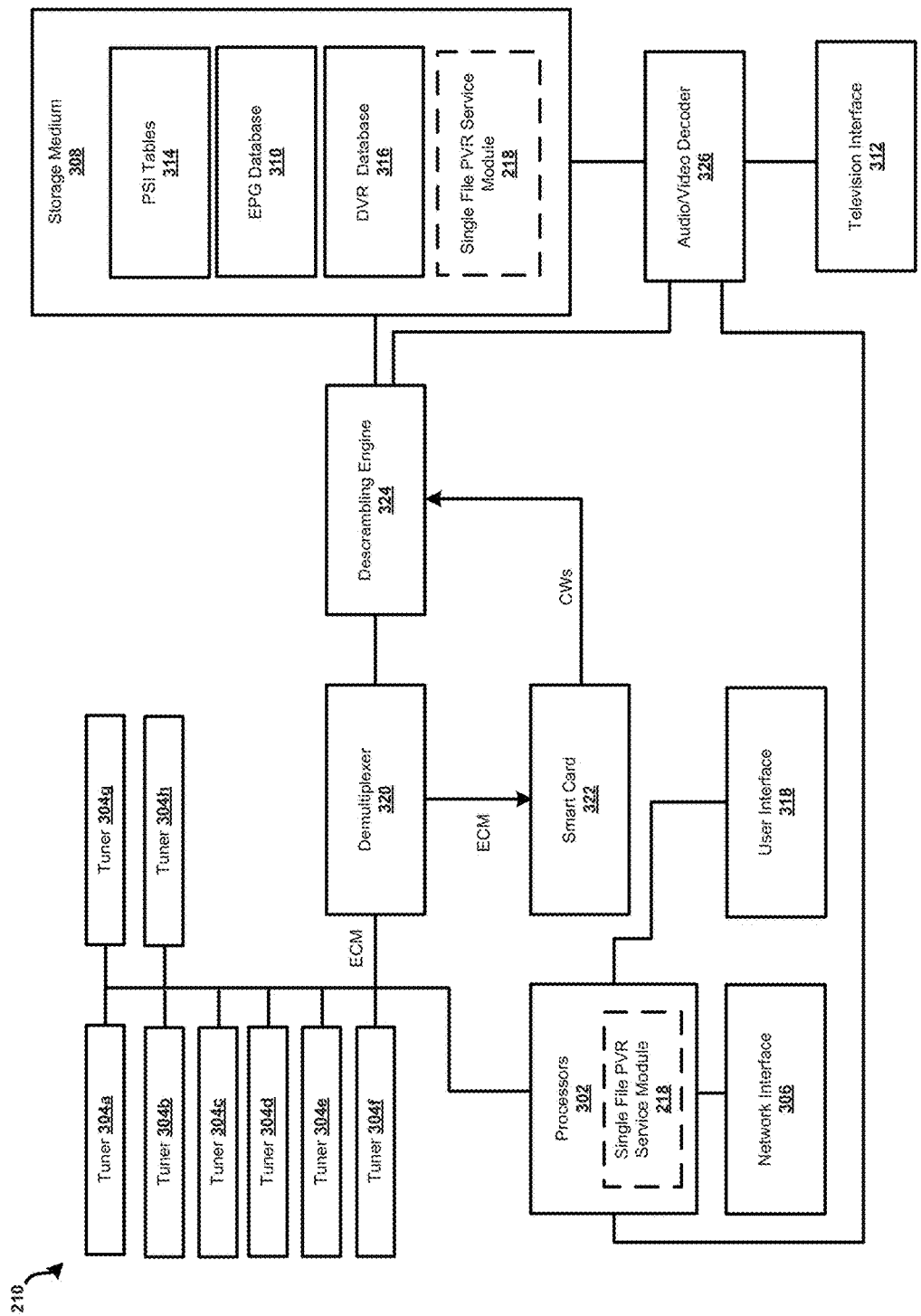
FIG. 3 shows an example block diagram for a television receiver according to the present disclosure.

Referring now to FIG. 3, an example block diagram of the PTR 210 of FIG. 2 is shown in accordance with the present disclosure. In some examples, at least one of the STRs 212*a-b* may be configured in a manner similar to that of the PTR 210. In other examples, at least one of the STRs 212*a-b* may be configured to exhibit a reduced functionality as compared to the PTR 210, and may depend at least to a certain degree on the PTR 210 to implement certain features or functionality. In this example, the STRs 212*a-b* may be referred to as a "thin client."

For brevity, the PTR 210 is depicted in a simplified form, and may generally include more or fewer elements or components as desired in accordance with the present disclosure. For example, the PTR 210 is shown in FIG. 3 to include the single file PVR service module 218. In general, and as discussed in further detail below, the single file PVR service module 218 may be configured to provide for one or more aspects of a creating a single file PVR per service ID. Other examples are possible as well.

Additionally, although not explicitly shown in FIG. 3, the PTR 210 may include one or more logical modules configured to implement a television streaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Additionally, the PTR 210 may be configured to include any number of other various components or logical modules that are implemented in hardware, software, firmware, or any combination thereof, and such components or logical modules may or may not be implementation-specific.

Referring still to FIG. 3, the PTR 210 in this example includes one or more processors 302, a plurality of tuners 304*a-h*, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, and at least one decoder 326. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304*a-h* may be used to tune to television channels, such as television channels transmitted via satellites (not shown). Each one of the tuners 304*a-h* may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304*a*) may be used to tune to a television channel on a first transponder stream for display using a television, while another tuner (e.g., tuner 304*b*) may be used to tune to a television channel on a second transponder for recording and viewing at some other time. If multiple television channels transmitted on the same transponder stream are desired, a particular tuner (e.g., tuner 304*c*) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, twelve tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites, which may be unidirectional to the PTR 210, and another communication channel between the service provider 202 and the PTR 210, which may be bidirectional, may be via a network, such as various wireless and/or hardwired packet-based communication networks, including, for example, a WAN (Wide Area Network), a HAN (Home Area Network), a LAN (Local Area Network), a WLAN (Wireless Local Area Network), the Internet, a cellular network, a home automation network, or any other type of communication network configured such that data may be transferred between and among respective elements of the satellite system 200. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the single file PVR service module 218 mentioned above. Recorded television programs may be stored using the storage medium 308.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites. For example, updates to the EPG database 310 may be received periodically via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example, eight television channels may be decoded concurrently or simultaneously.

The television interface 312 outputs a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304*a-h* and/or may be received via the network interface 306 over the network from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), a PMT (Program Management Table), etc.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more viewers or users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304*a-h*, television channels received via satellite may contain at least some encrypted or scrambled data. Packets of audio and video may be scrambled to prevent unauthorized users, such as nonsubscribers, from receiving television programming without paying the service provider 202. When one of the tuners 304*a-h* is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user, e.g., an individual who is associated with the PTR 210, has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304*a-h* may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

For brevity, the PTR 210 is depicted in a simplified form, and may generally include more or fewer elements or components as desired, including those configured and/or arranged for implementing various features associated with intelligently allocating idle tuner resources to buffer or record broadcast programming determined as desirable, as discussed in the context of the present disclosure. For example, the PTR 210 is shown in FIG. 3 to include the single file PVR service module 218 as mentioned above in connection with FIG. 2. Further, some routing between the various modules of the PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television streaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
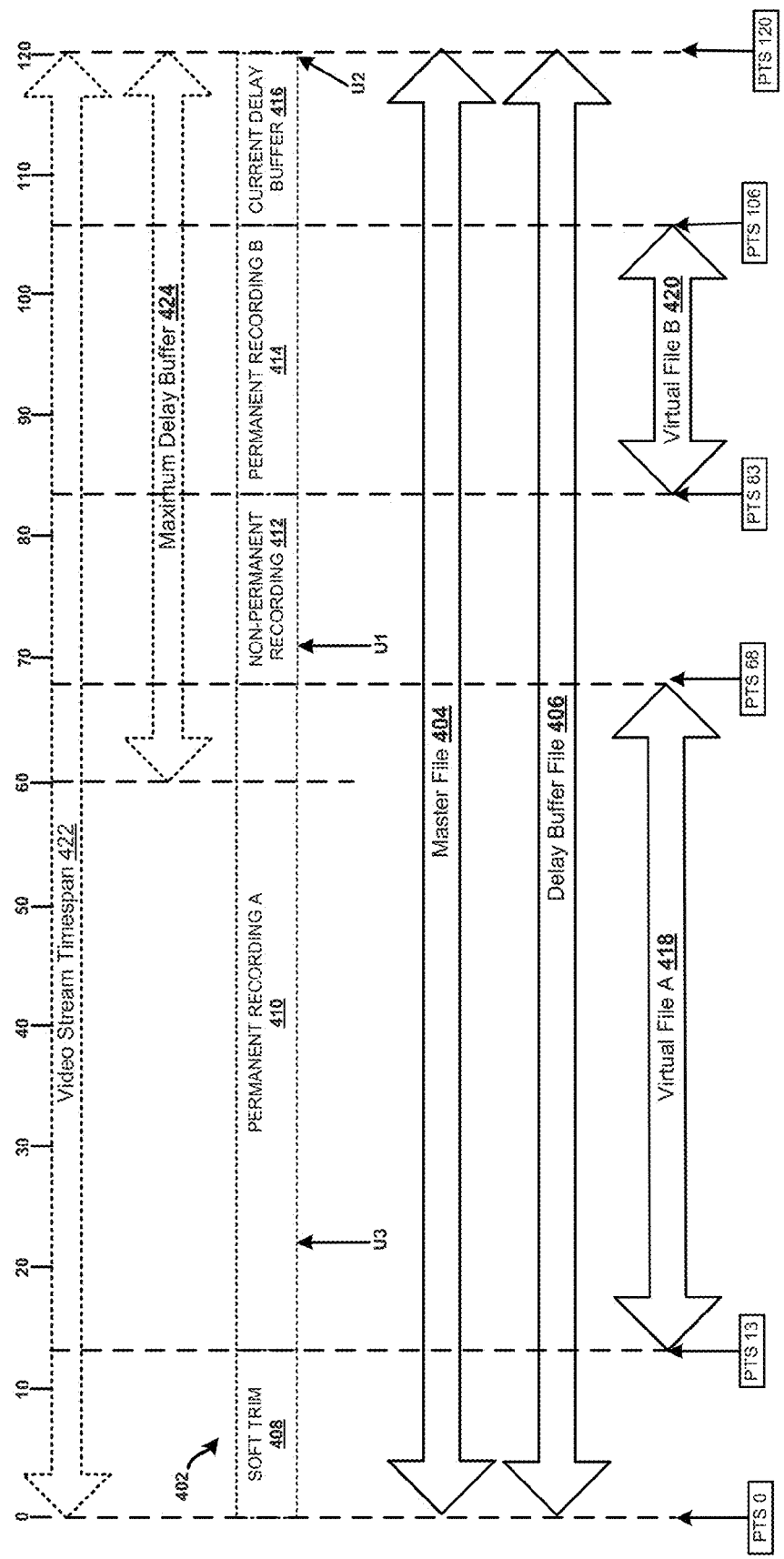
FIG. 4 shows an example schematic diagram of various features of a single file PVR per service identification ("ID") according to the present disclosure.

Turning now to FIG. 4, an example schematic diagram of various features of a single file PVR per service ID is shown. A video stream file or video stream 402 is shown having various representative components of content that may be received at a tuner of a television receiver, and/or recorded to an ongoing master file 404 and/or a delay buffer file 406. Such components of the video stream 402 may include a soft trim segment 408, a permanent recording A 410, a non-permanent recording 412, a permanent recording B 414, and/or a current delay buffer 416. It is contemplated that the video stream 402 may represent a particular television channel or service ID received at a tuner of the television receiver 210 and/or the single file PVR service module 218 thereof. Further, it is contemplated that the master file 404, delay buffer file 406, a virtual file A 418, and/or a virtual file B 420 are created at least in part by the single file PVR service module 218 described herein. Further, it is noted that the systems and methods shown herein is not limited to the particular example being shown and may include any number of permanent recordings, non-permanent recordings, and virtual files that are arranged in any order. In one example, the master file 404 comprises at least two different permanent recordings.

As shown in FIG. 4, the virtual file A 418 and virtual file B 420 contain metadata related to the permanent recording A 410 and permanent recording B 414, respectively, in the master file 404. The metadata may include a pair of timestamps and/or a pair of byte counts that indicate a startpoint and an endpoint of a permanent recording, whereby the startpoint may comprise the beginning of a scheduled recording and/or an event recording. Merely by way of example, the virtual file A 418 may include a starting presentation timestamp or starting PTS of 13 and an ending PTS of 68, which mark a start and end of the permanent recording A 410. Similarly, the virtual file B 420 may include a starting PTS of 83 and an ending PTS of 106 marking the start and end of the permanent recording B 414. Such timestamps may be included in the received video stream 402 and parsed by the single file PVR service module 218. For example purposes, a timeline showing a video stream timespan 422 is illustrated and marked in increments of ten. In the present example, the video stream 402 may be two hours length from a start point PTS 0 where the television receiver first tunes to the service ID at the soft trim 408 to an endpoint PTS 120 of the currently delay buffer 416, which may correspond to a live broadcast point.

As shown in FIG. 4, a span or length of the master file 404, and similarly the mirroring delay buffer file 406 that is created concurrently, may be about two hours length and/or the same length of the video stream 402 while the master file is still open, being written to, and/or while the service ID is still being accessed by one or more television receivers. It is contemplated that after the master file 404 is closed and/or the service ID is no longer being accessed, e.g. no users are watching and/or recording, the master file 404 may be processed, by the single file PVR service module 218, with a clean-up routine. The clean-up routine may include removing any areas of the master file 404 that are not marked as permanent recordings. For example, the clean-up routine may include "hole-punching," as described previously, the master file 404 to remove the non-permanent recording 412 and/or the current delay buffer 416.

It is noted that the soft trim segment 408 comprising a beginning of the video stream 402 may be removed automatically while the master file 404 is still open and being written. It is contemplated that the finalized master file 404 includes the permanent recording A 410 and permanent recording B 414, along with any other permanent recordings, and that the soft trim 408, non-permanent recording 412, and current delay buffer 416 are omitted therefrom. Further, it is contemplated that the permanent recordings are not shifted upon deletion of any portions or intermediary segments, such as upon deletion of the non-permanent recording 412. Other examples are possible.

It is noted that the master file 404, delay buffer file 406, virtual file A 418, and/or virtual file B 420 may comprise any type of file format, such as .tsp file, .wtt file, .art file, and/or .bm file. In a particular example, the master file 404 is written to a hard disk at the television receiver 210 as a .tsp file. Further, it is contemplated that a combination of different file formats may be utilized for the master file 404, delay buffer file 406, virtual file A 418, and/or virtual file B 420. In general, it is contemplated that the master file 404 and delay buffer file 406 are created at the same time and/or upon tuning to the service ID, i.e. at PTS 0.

FIG. 4 further illustrates a span or length of an example maximum delay buffer 424. Here, it is contemplated the maximum delay buffer 424 may be 60 minutes from live, e.g. PTS 120, however this length may be user configured and/or dependent on an available amount of storage space at the television receiver. For instance, all or a portion of the delay buffer may be maintained, by the single file PVR service module 218, for a limited or maximum amount of time, such as 24 hours, 8 hours, or any amount of time configured by the user for access at a later point. In another aspect, a limit or maximum to a length of the delay buffer 424 may be set according to a number of events, such as 10 events or any number of events determined by the user. Upon reaching the number of events, the delay buffer 424 may be overwritten, deleted, and/or a new delay buffer 424 may be created. In another example, the delay buffer 424 may be maintained and stored by the single file PVR service module 218 instead of stopped and deleted upon detection of the last user leaving the service ID.

Further, it is noted that the hole-punching of the master file 404 to remove non-permanent recording 412 may also be performed by the single file PVR service module 218 while the master file 404 is still open. In other words, the master file 404 does not need to be closed in order for the clean-up routine to initiate and/or for hole-punching to initiate. For example, the 60 minute rewind window or the maximum delay buffer 424 comprises a sliding window, whereby the single file PVR service module 218 may clean up, e.g. hole-punch, any portions of non-permanent recordings older than, or otherwise outside of, that window, even while the master file 404 is still open and being written to. It is noted that another form of hole-punch includes the soft trim for deleting the soft trim segment 408 at the beginning of the master file 404, which may also occur while the master file 404 is open and not yet closed.

As further illustrated in FIG. 4, various scenarios of user access of the service ID are shown for example purposes. A first user U1, which may represent the television receiver 210 and/or a primary television receiver, may tune into or otherwise access the service ID or video stream 402 during a non-permanent recording 412 segment of the video stream 420. The first user U1 is shown viewing a portion of media content included in the maximum delay buffer 424, and may be able to rewind and/or fast forward within the maximum delay buffer 424, which may be a 60 minute window from live. A second user U2, which may represent a secondary television receiver operatively connected to the primary television receiver, may be live, e.g. accessing the video stream 402 at PTS 120, and may be able to rewind back within the maximum delay buffer 424, e.g. within the 60 minute window from live. In the present example, it is contemplated that users U1 and U2, which are not in a playback mode of the permanent recordings, are restricted to the maximum delay buffer 424, which may serve as a hard limit for rewind.

A third user U3, which may represent another secondary television receiver operatively connected to the primary television receiver, may be in playback mode watching the permanent recording A 410. Once the endpoint PTS 68 of the permanent recording A 410 is reached, and/or upon approaching the endpoint, the single file PVR service module 218 may output a user interface, such as a pop-up or other notification indicating that the playback is over. In some cases, as shown in example FIG. 4, the endpoint PTS 68 of the permanent recording A 410 falls within the maximum delay buffer 424, such that upon reaching the endpoint PTS 68, the single file PVR service module 218 may transition to that point in the maximum delay buffer 424, may be taken live to PTS 120, and/or may rewind to a start, e.g. PTS 0, of the delay buffer file 406 upon user selection. In this way, users in playback mode may not be limited to the maximum delay buffer 424. It is noted that the delay buffer file 406 is available as long as the master file 404 is not yet closed and/or other users are watching or recording the service ID or video stream 402. Other examples are possible. Merely by way of example, at the end of playback, a prompt may be output by the single file PVR service module 218 to a display screen. The prompt may list additional permanent recordings on the master file 404, or permanent recordings of other master files that may be available.

Figure 5:
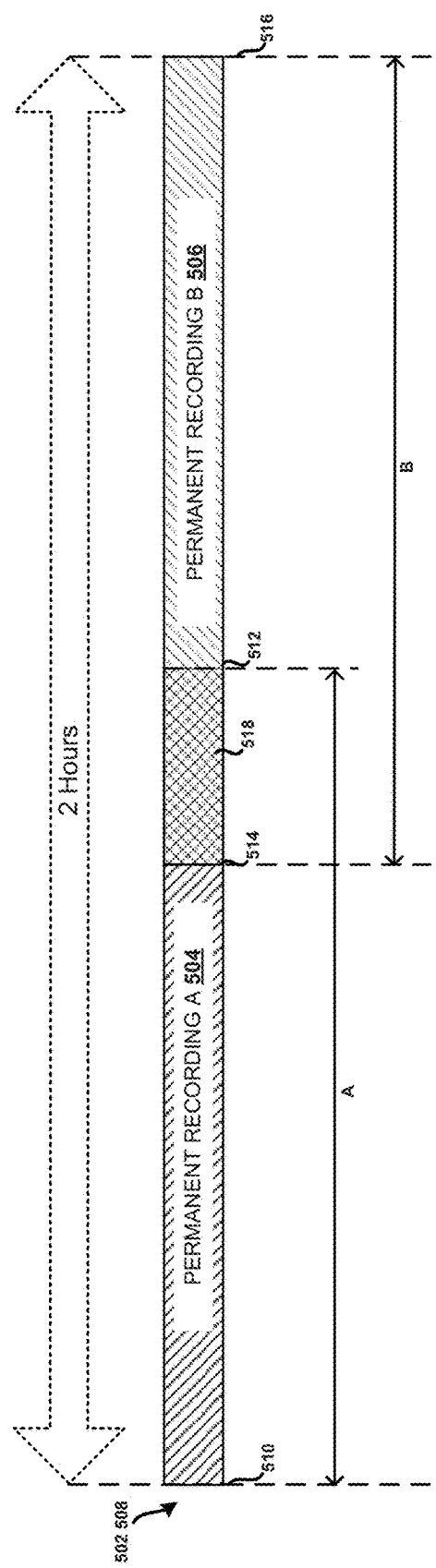
FIG. 5 shows an example schematic diagram of various features of a single file PVR per service ID for back to back timers according to the present disclosure.

Turning now to FIG. 5, an example schematic diagram of various features of a single file PVR per service ID for back-to-back timers is shown. A video stream 502 may include two back-to-back programs scheduled for recording, whereby no intermediate or non-permanent recordings may be included. As such, the video stream 502 may be recorded as a permanent recording A 504 and a permanent recording B 506 to define a master file 508. The master file 508, at least in regard to the portions shown in FIG. 5, may not require a clean-up that involves hole-punching, since there are no intermediary and/or non-permanent segments.

Further shown in FIG. 5, the permanent recording A 504 is shown having a startpoint 510 and an endpoint 512, thereby defining a file length A. The permanent recording B 506 is shown having a startpoint 514 and an endpoint 516, thereby defining a file length B. As such, an overlap region 518 between the startpoint 514 and the endpoint 512 includes an overlapping, begin-early portion of the permanent recording B 506 and an overlapping, end-early portion of the permanent recording A 504. In this way, the single file PVR service module 218 may maintain a begin-early and end-late portion of an overlapping timer. In practice, this may enhance user experience by eliminating a need to manually locate previously recorded shows that may contain beginning and/or ending portions of the recorded television programs desired for playback. Further, this approach may avoid and/or reduce duplicate data that would otherwise be written, such as the data falling within the overlap region 518. It is contemplated that any plurality of back-to-back timers may be included. Further, it is contemplated that a delay buffer is created and maintained to allow any users tuning to the service ID or video stream 502 to have rewind capability, e.g. rewind within a 60 minute window from a live point. Other examples are possible.

In a further aspect, the television receiver may receive user indication to delete one of the first or second permanent recordings. In that case, the single file PVR service module 218 may hole-punch portions of the indicated recording out of the master file 508 that do not overlap with the remaining recording. For example, the single file PVR service module 218 may receive user initiation or indication to delete a movie, which may be represented by the permanent recording A 504. In response, the single file PVR service module 218 may delete the permanent recording A 504 except for portions of the permanent recording A 504 that overlap with the permanent recording B 506, such as the begin-early and end-late portions defined in the overlap region 518. In this way, events may be deleted but parts of the event that comprise the end of the permanent recording A 504 but the beginning of the permanent recording B 506 may be kept, since the permanent recording B 506 is maintained on the master file.

In yet another example feature, one or more of the permanent recordings may be moved to an external hard drive that is communicatively coupled with the television receiver 210. The external hard drive may provide additional storage space, for example, when the local or internal hard drive at the television receiver 210 is full. For example, the television receiver 210 may receive user indication to move specific content off of the internal drive of the television receiver 210 and put the content into the external drive, which may further archive and organize permanent recording(s) stored therein. The external drive may be operatively connected with a plurality of television receivers, such as both primary and secondary television receivers. Upon user initiation, the single file PVR service module 218 may move .tsp data, e.g. a user-selected permanent recording, out of the master file 508 to the external drive. The portions of the .tsp data that correspond to the selected permanent recording and do not overlap with other permanent recordings or events may be hole-punched from the master file 508 of the television receiver 210, since they are moved to the external drive. In another example, any portions of the .tsp data that correspond to the selected permanent recording and do overlap with other permanent recordings may be copied and moved to the external drive, and then hole-punched from the master file 508. The hole-punching of data within the master file 508 may be performed at any time the event is deleted, or otherwise moved, to the external hard drive.

Figure 6:
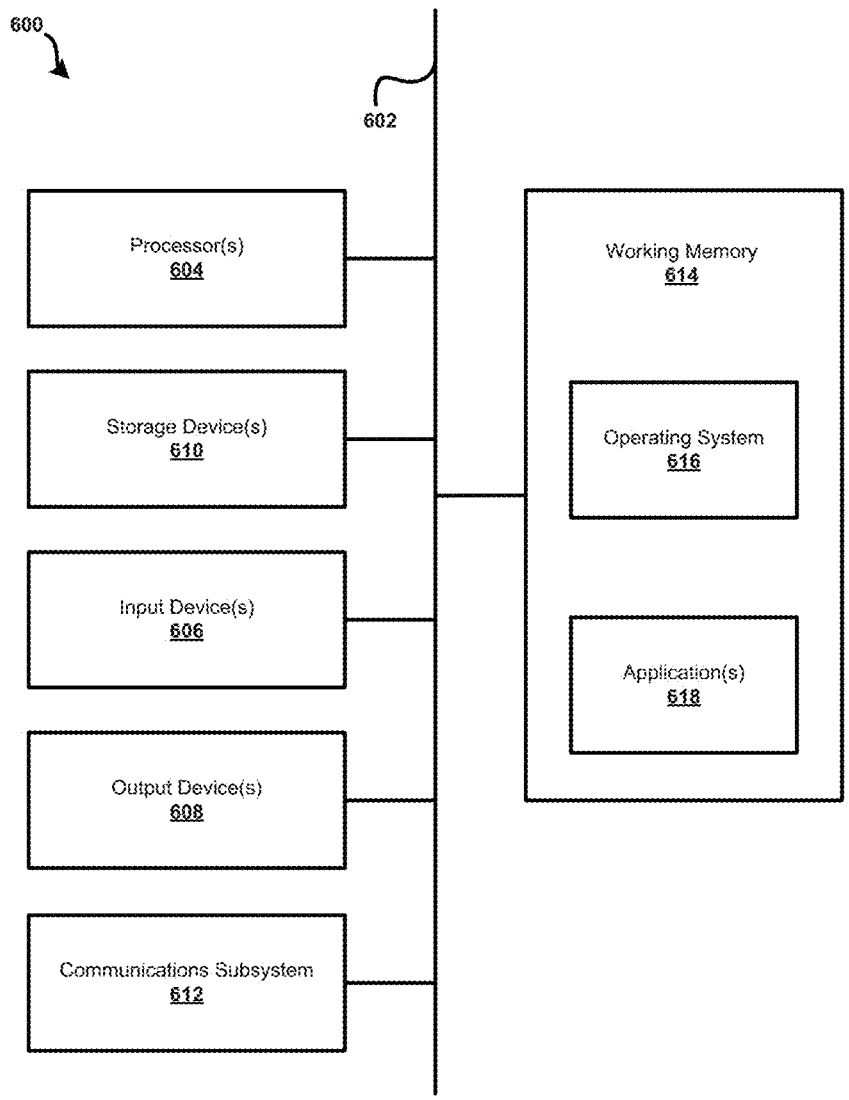
FIG. 6 shows an example block diagram for a computing system upon which various features of the present disclosure may be provided.

Turning now to FIG. 6, an example block diagram for a computer system or device 600 upon which various features of the present disclosure may be provided is shown. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 600, such as any of the respective elements of at least FIG. 2 and FIG. 3. In this manner, any of one or more of the respective elements of at least FIG. 2 and FIG. 3 may be configured to perform and/or include instructions that, when executed, perform the methods and features of FIG. 1, FIG. 4, and/or FIG. 5. Still further, any of one or more of the respective elements of at least FIG. 2 may be configured to perform and/or include instructions that, when executed, instantiate and implement functionality of the PTR 210 and/or the server(s).

The computer device 600 is shown comprising hardware elements that may be electrically coupled via a bus 602 (or may otherwise be in communication, as appropriate). The hardware elements may include a processing unit with one or more processors 604, including without limitation one or more general-purpose processors and/or one or more special-purpose processors (such as digital signal processing chips, graphics acceleration processors, and/or the like); one or more input devices 606, which may include without limitation a remote control, a mouse, a keyboard, and/or the like; and one or more output devices 608, which may include without limitation a presentation device (e.g., television), a printer, and/or the like.

The computer system 600 may further include (and/or be in communication with) one or more non-transitory storage devices 610, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 600 might also include a communications subsystem 612, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 612 may permit data to be exchanged with a network (such as the network described below, to name one example), other computer systems, and/or any other devices described herein. In many embodiments, the computer system 600 will further comprise a working memory 614, which may include a random access memory and/or a read-only memory device, as described above.

The computer device 600 also may comprise software elements, shown as being currently located within the working memory 614, including an operating system 616, device drivers, executable libraries, and/or other code, such as one or more application programs 618, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 610 described above. In some cases, the storage medium might be incorporated within a computer system, such as computer system 600. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 600) to perform methods in accordance with various embodiments of the disclosure. According to a set of embodiments, some or all of the procedures of such methods are performed by the computer system 600 in response to processor 604 executing one or more sequences of one or more instructions (which might be incorporated into the operating system 616 and/or other code, such as an application program 618) contained in the working memory 614. Such instructions may be read into the working memory 614 from another computer-readable medium, such as one or more of the storage device(s) 610. Merely by way of example, execution of the sequences of instructions contained in the working memory 614 may cause the processor(s) 604 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 600, various computer-readable media might be involved in providing instructions/code to processor(s) 604 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 610. Volatile media may include, without limitation, dynamic memory, such as the working memory 614.

Example forms of physical and/or tangible computer-readable media may include a floppy disk, a flexible disk, hard disk, magnetic tape, or any other magnetic medium, a compact disc, any other optical medium, ROM, RAM, and etc., any other memory chip or cartridge, or any other medium from which a computer may read instructions and/or code. Various forms of computer-readable media may be involved in carrying one or more sequences of one or more instructions to the processor(s) 604 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 612 (and/or components thereof) generally will receive signals, and the bus 602 then might carry the signals (and/or the data, instructions, etc. carried by the signals) to the working memory 614, from which the processor(s) 604 retrieves and executes the instructions. The instructions received by the working memory 614 may optionally be stored on a non-transitory storage device 610 either before or after execution by the processor(s) 604.

It should further be understood that the components of computer device 600 can be distributed across a network. For example, some processing may be performed in one location using a first processor while other processing may be performed by another processor remote from the first processor. Other components of computer system 600 may be similarly distributed. As such, computer device 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for recording multiple broadcast television programs to a single file, comprising:
   receiving, by a first television receiver, user selection for recording a first media content and a second media content;
   determining, by the first television receiver, the first media content and the second media content are provided on a single television service;
   tuning, by the first television receiver, to the television service to receive the first media content via a tuner of the television receiver;
   recording, by the first television receiver, the first media content as a first permanent recording to a master file;

receiving, by the first television receiver, the second media content via the tuner of the television receiver;

recording, by the first television receiver, the second media content as a second permanent recording to the master file;

recording, by the first television receiver, at least one non-permanent segment of media content received at the tuner after recording the first media content and before recording the second media content, wherein the non-permanent segment is recorded to the master file between an end of the first permanent recording and a beginning of the second permanent recording;

detecting, by the first television receiver, that the single television service is no longer being accessed by the first television receiver or by a second television receiver in communication with the first television receiver, wherein detecting that the single television service is no longer being accessed includes detecting that no tuners on the first or second television receiver are accessing the single television service;

removing, by the first television receiver, the at least one recorded non-permanent segment from the master file in response to detecting that the single television service is no longer being accessed; and transmitting, by the first television receiver, the master file to the second television receiver.

2. The method for recording multiple broadcast television programs to a single file of claim 1,
wherein the first media content and the second media content are received consecutively at the same tuner of the first television receiver.

3. The method for recording multiple broadcast television programs to a single file of claim 1, comprising:
recording, by the first television receiver, additional media contents received at the single television service as additional permanent recordings.

4. The method for recording multiple broadcast television programs to a single file of claim 1,
wherein the single television service comprises a single television channel.

5. The method for recording multiple broadcast television programs to a single file of claim 1,
wherein the user selection for recording at least one of the first and second media contents comprises at least one of a scheduled recording and an event recording, wherein the event recording comprises receiving a user input to record media content while the media content is being output, by the first television receiver, to a display device.

6. The method for recording multiple broadcast television programs to a single file of claim 5, comprising:
detecting, by the first television receiver, manual initiation of a record function via a remote control for the user selection of the event recording.

7. The method for recording multiple broadcast television programs to a single file of claim 1, comprising:
recording, by the first television receiver, a soft trim segment of media content immediately preceding the first permanent recording, wherein the soft trim segment is received at the tuner prior to a timer starting for the first permanent recording; and
removing, by the first television receiver, the recorded soft trim segment from the master file.

8. The method for recording multiple broadcast television programs to a single file of claim 1, comprising:
creating, by the first television receiver, a first virtual file corresponding to the first permanent recording and a second virtual file corresponding to the second permanent recording, wherein each of the first and second virtual files comprise metadata indicating a location in the master file for the first or second permanent recordings, respectively.

9. The method for recording multiple broadcast television programs to a single file of claim 8,
wherein the metadata of each of the first and second virtual files include presentation timestamps corresponding to a start time and an end time of the first and second permanent recordings, respectively.

10. The method for recording multiple broadcast television programs to a single file of claim 8,
wherein the first virtual file and the second virtual file indicate portions of the master file that are not deleted upon closing, by the first television receiver, the master file.

11. The method for recording multiple broadcast television programs to a single file of claim 1, comprising:
creating, by the first television receiver, a delay buffer file mirroring the master file; and
deleting, by the first television receiver, the delay buffer file upon detecting, by the first television receiver, that the single television service is no longer being accessed for at least one of viewing and recording.

12. The method for recording multiple broadcast television programs to a single file of claim 11, comprising:
recording, by the first television receiver, the delay buffer file upon tuning to the television service to receive the first media content.

13. The method for recording multiple broadcast television programs to a single file of claim 11, comprising:
deleting, by the first television receiver, the delay buffer upon detecting that the master file is closed.

14. The method for recording multiple broadcast television programs to a single file of claim 11,
wherein detecting the master file is closed comprises receiving, by the first television receiver, a user selection to power down the first television receiver.

15. The method for recording multiple broadcast television programs to a single file of claim 1,
wherein the master file comprises a .tsp file that is written to a local hard drive at the first television receiver.

16. A computer-readable medium having stored thereon a series of instructions which, when executed by a processor, cause the processor to record multiple television programs to a single file by:
receiving, by a first television receiver, user selection for recording a first media content and a second media content;
determining, by the first television receiver, the first media content and the second media content are provided on a single television service;
tuning, by the first television receiver, to the television service to receive the first media content via a tuner of the television receiver;
recording, by the first television receiver, the first media content as a first permanent recording to a master file;
receiving, by the first television receiver, the second media content via the tuner of the television receiver;
recording, by the first television receiver, the second media content as a second permanent recording to the master file;
recording, by the first television receiver, at least one non-permanent segment of media content received at the tuner after recording the first media content and before recording the second media content, wherein the non-permanent segment is recorded to the master file between an end of the first permanent recording and a beginning of the second permanent recording;

detecting, by the first television receiver, that the single television service is no longer being accessed by the first television receiver or by a second television receiver in communication with the first television receiver, wherein detecting that the single television service is no longer being accessed includes detecting that no tuners on the first or second television receiver are accessing the single television service;

removing, by the first television receiver, the at least one recorded non-permanent segment from the master file in response to detecting that the single television service is no longer being accessed; and transmitting, by the first television receiver, the master file to the second television receiver.

17. A system for recording multiple television programs to a single file, comprising:

one or more processors; and a memory communicatively coupled with and readable by the one or more processors and having stored therein processor-readable instructions that, when executed by the one or more processors, cause the one or more processors to:

receive, by a first television receiver, user selection for recording a first media content and a second media content;

determine, by the first television receiver, the first media content and the second media content are provided on a single television service;

tune, by the first television receiver, to the television service to receive the first media content via a tuner of the television receiver;

record, by the first television receiver, the first media content as a first permanent recording to a master file;

receive, by the first television receiver, the second media content via the tuner of the television receiver;

record, by the first television receiver, the second media content as a second permanent recording to the master file;

record, by the first television receiver, at least one non-permanent segment of media content received at the tuner after recording the first media content and before recording the second media content, wherein the non-permanent segment is recorded to the master file between an end of the first permanent recording and a beginning of the second permanent recording;

detect, by the first television receiver, that the single television service is no longer being accessed by the first television receiver or by a second television receiver in communication with the first television receiver, wherein detecting that the single television service is no longer being accessed includes detecting that no tuners on the first or second television receiver are accessing the single television service;

remove, by the first television receiver, the at least one recorded non-permanent segment from the master file in response to detecting that the single television service is no longer being accessed; and transmit, by the first television receiver, the master file to the second television receiver.

18. The method for recording multiple broadcast television programs to a single file of claim 1, wherein detecting that the single television service is no longer being accessed by the first television receiver or by a second television receiver includes using a first access status of the first television receiver and a second access status of the second television receiver, wherein an access status of a television receiver indicates a status of the television receiver.

19. The method for recording multiple broadcast television programs to a single file of claim 1, further comprising:

determining, by the first television receiver, that all non-permanent segments from the media content have been deleted; and transmitting, by the first television receiver, the master file to the second television receiver after determining that all non-permanent segments from the media content have been deleted.

20. The method for recording multiple broadcast television programs to a single file of claim 1, wherein transmitting the master file to the second television receiver facilitates viewing of the first and second media content using the master file.

* * * * *